(12) United States Patent
Webb

(10) Patent No.: US 9,202,433 B2
(45) Date of Patent: Dec. 1, 2015

(54) MULTI OPERATION SLIDER

(71) Applicant: Apple Inc., Cupertino, CA (US)

(72) Inventor: Russell Y. Webb, San Jose, CA (US)

(73) Assignee: APPLE INC., Cupertino, CA (US)

( * ) Notice: Subject to any disclaimer, the term of this patent is extended or adjusted under 35 U.S.C. 154(b) by 176 days.

(21) Appl. No.: 13/629,523

(22) Filed: Sep. 27, 2012

(65) Prior Publication Data
US 2013/0235070 A1 Sep. 12, 2013

Related U.S. Application Data

(60) Provisional application No. 61/607,540, filed on Mar. 6, 2012, provisional application No. 61/607,574, filed on Mar. 6, 2012.

(51) Int. Cl.
G09G 5/02 (2006.01)
(52) U.S. Cl.
CPC .......... *G09G 5/02* (2013.01); *G09G 2320/0606* (2013.01); *G09G 2320/0666* (2013.01)
(58) Field of Classification Search
CPC .............. G06F 3/0482; G06F 3/04847; H04N 5/44543; H04N 5/57; H04N 9/68; H04N 9/73
See application file for complete search history.

(56) References Cited

U.S. PATENT DOCUMENTS

| 5,491,782 | A | 2/1996 | King et al. |
| 5,517,335 | A | 5/1996 | Shu |
| 5,774,112 | A | 6/1998 | Kasson |
| 6,262,817 | B1 | 7/2001 | Sato et al. |
| 6,348,936 | B1 | 2/2002 | Berteig |
| 6,351,557 | B1 | 2/2002 | Gonsalves |
| 6,438,264 | B1 | 8/2002 | Gallagher et al. |
| 6,778,186 | B2 | 8/2004 | Mehigan |
| 6,842,541 | B2 | 1/2005 | Curry |
| 6,944,335 | B2 | 9/2005 | Pettigrew et al. |
| 7,034,881 | B1 | 4/2006 | Hyodo et al. |

(Continued)

FOREIGN PATENT DOCUMENTS

| EP | 0632363 | 1/1995 |
| EP | 0693738 | 1/1996 |

(Continued)

OTHER PUBLICATIONS

Author Unknown, "Using Adobe Photoshop CS4," Jan. 10, 2010, 707 pages, Adobe Systems Incorporated, San Jose, California, USA.

(Continued)

*Primary Examiner* — Antonio A Caschera
(74) *Attorney, Agent, or Firm* — Adeli LLP

(57) ABSTRACT

An image editing application with a novel color modification slider tool adjusts one or more color attributes of different pixels differently when moved in one direction, and adjusts one or more color attributes of the same pixel differently when moved in another direction. This tool produces non-photorealistic effects by treating differently the highly saturated and lowly saturated pixels of an image. Specifically, the saturation tool performs either (1) a positive de-saturation effect that de-saturates the low saturated pixels of an image while enhancing the saturation of the high saturated pixels, or (2) a negative de-saturation effect that de-saturates the high saturated pixels of the image while leaving intact or slightly modifying the saturation level of the lowly saturated pixels.

38 Claims, 18 Drawing Sheets

(56) References Cited

U.S. PATENT DOCUMENTS

| | | |
|---|---|---|
| 7,092,122 B2 | 8/2006 | Iwaki |
| 7,095,434 B1 | 8/2006 | Ikeda |
| 7,184,056 B2 | 2/2007 | Brody et al. |
| 7,227,990 B2 | 6/2007 | Hirao |
| 7,242,409 B2 | 7/2007 | Cain |
| 7,292,370 B2 | 11/2007 | Iwaki |
| 7,489,305 B2 | 2/2009 | Salisbury et al. |
| 7,562,310 B2 | 7/2009 | Champion et al. |
| 7,598,964 B2 | 10/2009 | Olson |
| 7,602,991 B2 | 10/2009 | Kokemohr |
| 7,636,108 B2 | 12/2009 | Suzuki et al. |
| 7,675,648 B2 | 3/2010 | Ernst et al. |
| 7,702,149 B2 | 4/2010 | Ohkubo et al. |
| 7,706,606 B1 | 4/2010 | Ruzon et al. |
| 7,750,947 B2 | 7/2010 | Ahn |
| 7,853,094 B2 | 12/2010 | Pan et al. |
| 7,954,067 B2 | 5/2011 | Breglio |
| 7,978,938 B1 | 7/2011 | Wilensky |
| 8,023,164 B2 | 9/2011 | Ogawa |
| 8,031,365 B2 * | 10/2011 | Oka .................. 358/1.9 |
| 8,055,067 B2 | 11/2011 | Petrescu et al. |
| 8,098,259 B2 | 1/2012 | Kondo et al. |
| 8,139,080 B2 | 3/2012 | Relyea et al. |
| 8,155,465 B2 | 4/2012 | Cho et al. |
| 8,341,542 B2 | 12/2012 | Brody et al. |
| 8,441,499 B2 | 5/2013 | Heynen et al. |
| 8,468,465 B2 | 6/2013 | Warner et al. |
| 8,582,834 B2 | 11/2013 | Tong et al. |
| 8,713,479 B2 | 4/2014 | Mikawa et al. |
| 8,743,139 B2 | 6/2014 | Pettigrew et al. |
| 2001/0028738 A1 | 10/2001 | Pettigrew et al. |
| 2001/0036310 A1 | 11/2001 | Pettigrew et al. |
| 2003/0021488 A1 | 1/2003 | Shaw et al. |
| 2003/0025835 A1 | 2/2003 | Segman |
| 2003/0038832 A1 | 2/2003 | Sobol |
| 2003/0103057 A1 | 6/2003 | Graves et al. |
| 2003/0151611 A1 | 8/2003 | Turpin et al. |
| 2005/0212824 A1 | 9/2005 | Marcinkiewicz et al. |
| 2006/0028483 A1 | 2/2006 | Kondo et al. |
| 2006/0203004 A1 | 9/2006 | Hwang et al. |
| 2006/0204034 A1 | 9/2006 | Steinberg et al. |
| 2006/0284895 A1 | 12/2006 | Marcu et al. |
| 2007/0065006 A1 | 3/2007 | Wilensky |
| 2007/0171443 A1 | 7/2007 | Pan |
| 2007/0189627 A1 | 8/2007 | Cohen et al. |
| 2007/0195343 A1 | 8/2007 | Yoneda |
| 2008/0034289 A1 | 2/2008 | Doepke et al. |
| 2008/0056564 A1 | 3/2008 | Lindbloom et al. |
| 2008/0117333 A1 | 5/2008 | Walsh |
| 2008/0225058 A1 | 9/2008 | Hertzfeld et al. |
| 2008/0256489 A1 | 10/2008 | Maurer et al. |
| 2009/0201310 A1 | 8/2009 | Weiss |
| 2009/0202173 A1 | 8/2009 | Weiss et al. |
| 2009/0204913 A1 | 8/2009 | Kawano et al. |
| 2010/0026831 A1 | 2/2010 | Ciuc et al. |
| 2010/0054549 A1 | 3/2010 | Steinberg et al. |
| 2011/0103684 A1 | 5/2011 | Bhatt et al. |
| 2011/0182511 A1 | 7/2011 | Chien et al. |
| 2011/0219329 A1 | 9/2011 | Breglio |
| 2012/0020553 A1 | 1/2012 | Pettigrew et al. |
| 2012/0036480 A1 | 2/2012 | Warner et al. |
| 2012/0051658 A1 | 3/2012 | Tong et al. |
| 2013/0227448 A1 | 8/2013 | Heynen et al. |

FOREIGN PATENT DOCUMENTS

| | | |
|---|---|---|
| EP | 0989739 | 3/2000 |
| EP | 1087614 | 3/2001 |
| EP | 1326425 | 7/2003 |
| EP | 1573501 | 9/2005 |
| WO | WO 2004/046906 | 6/2004 |
| WO | 2007/145654 | 12/2007 |
| WO | WO 2009/102514 | 8/2009 |

OTHER PUBLICATIONS

Author Unknown, "How to Manage and Work with Digital Images, Using FastStone Image Viewer Version 4.5," FastStone Soft, Jun. 10, 2011, pp. 1-95.

Benedetti, Luca, et al., "Color to Gray Conversions in the Context of Stereo Matching Algorithms," Machine Vision and Applications, Dec. 7, 2010, pp. 1-32.

Dodgson, Neil A., et al., "Contrast Brushes: Interactive Image Enhancement by Direct Manipulation," Computational Aesthetics in Graphics, Visualization, and Imaging, Month Unknown, 2009, 8 pages, The Eurographics Association.

Ho, Kevin I-J, "Automatic Image Processing System for Beautifying Human Faces," Color Science and Imaging Technologies—Proceedings of SPIE, Month Unknown, 2002, pp. 23-32, vol. 4922.

O'Neil, Steve, "Using Adobe Photoshop," Chapter 7—Image Adjustments, Month Unknown, 2006, pp. 1-12.

Yanz, Jerry, et al., "Hearing Instrument Technology: Tech Topic, Toward New Software Goals: Delighting Patients with Interactivity," The Hearing Review, Jan. 2008, pp. 1-9, Allied Media.

Author Unknown, "Photographic Editing—Workflow," WaybackMachine, May 9, 2011, 68 pages.

Author Unknown, "Adobe Photoshop 5.0 Limited Edition, Chapter 4: Making Color and Tonal Adjustments," Adobe Photoshop 5.0 User Guide, Jan. 1, 1998, 11 pages.

Author Unknown , "Screenshots #1-13 of Microsoft Windows NT 4.0," Microsoft Corporations, Copyright 1981-1998. Released Aug. 1996. Screenshots created Oct. 13, 2004, 17 pages.

Author Unknown, "Photoshop Touch for Android: Part 2 The Tools," Month Unknown, 2014, 15 pages, available at http://www.gamefromscratch.com/page//Photoshop-Touch-for-Android-Part-2-The-Tools.aspx.

Messieh, Nancy, "Snapseed for iPad: Photo editing at the swipe of a finger," Jun. 8, 2011, 10 pages, available at http://thenextweb.com/apps/2011/06/08/snapseed-for-ipad-photo-editing-at-the-swipe-of-a-finger/.

* cited by examiner

MULTI OPERATION SLIDER

CLAIM OF BENEFIT TO PRIOR APPLICATIONS

This application claims benefit to U.S. Provisional Patent Application 61/607,540, entitled "Multi Operation Slider," filed Mar. 6, 2012 and U.S. Provisional Patent Application 61/607,574, entitled "Media Editing Application with Robust Tools", filed Mar. 6, 2012. The above-mentioned application, namely U.S. Provisional Patent Applications 61/607,540 and U.S. Provisional Patent Application 61/607,574, are incorporated herein by reference.

BACKGROUND

Digital graphic design and media editing applications (hereafter collectively referred to as image editing applications or media editing applications) provide graphical designers, media artists, and other users with the necessary tools to view and edit an image. Examples of such applications include iPhoto®, Aperture®, iMovie® and Final Cut Pro®, all sold by Apple, Inc. These applications give users the ability to edit images in a variety of manners.

Many media editing applications provide many different effects that a user can select to apply to an image. Many of these effects have complicated controls that make it difficult for a user to specify the desired effect. For instance, some of these controls require the user to have extensive knowledge about an effect and its associated parameters. Furthermore, the controls for adjusting different aspects of some effects are dispersed in different locations of the user interface. These deficiencies make it difficult at times to edit the image.

BRIEF SUMMARY

Some embodiments provide an image editing application with a novel color modification slider tool. In some embodiments, this tool adjusts one or more color attributes (e.g., one or more color channels) of different pixels differently when moved in one direction, and adjusts one or more color attributes of the same pixel differently when moved in another direction. The movement of this tool is in a straight line in some embodiments, while it is along an angular arc (e.g., along the circumference of a full or partial circle or elliptical shape) in other embodiments.

This tool in some embodiments is a novel saturation tool that produces non-photorealistic effects by treating differently the highly saturated and lowly saturated pixels of an image. Specifically, in some embodiments, the saturation tool performs either (1) a positive de-saturation effect that de-saturates the low saturated pixels of an image while enhancing the saturation of the high saturated pixels, or (2) a negative de-saturation effect that de-saturates the high saturated pixels of the image while leaving intact or slightly modifying the saturation level of the lowly saturated pixels. For an original image that has some saturated pixels, both these effects produce grey looking images but the first effect has more saturated pixels and hence looks a bit more non-photorealistic because it contains both grey and colorful pixels.

The saturation tool of some embodiments has a slider that slides along a straight or curved region with a central location that serves as an origin. In some of these embodiments, the slider performs the positive de-saturation effect when it moves to the right from its central location, and performs the negative de-saturation effect when it moves to the left from its central location.

To treat the high and low saturated pixels of an image differently, the saturation tool of some embodiments implicitly or explicitly classifies the pixels of the image. In addition, the saturation tool of some embodiments also implicitly or explicitly classifies the mid saturated pixels of the image, and treats the mid saturated pixels differently than the high and low saturated pixels. In some embodiments, the classification of pixels as high saturated, low saturated and mid saturated depends on the position of the saturation slider along the sliding region. Also, depending on the position of the slider, some embodiments treat different mid saturated pixels differently. For instance, while the slider moves to the right, the mid saturated classified pixels that are more saturated will experience a gradual increase in their saturation that pushes their values closer in value to the saturated pixels, while the mid saturated pixels that are less saturated will experience a gradual decrease in their saturation level that pushes their values closer to the non-saturated pixels. In some embodiments, the amount of the particular increase or decrease in saturation will vary based on the particular amount that the slider has been moved.

In order to produce the non-photorealistic image, the saturation tool of some embodiments blends the original image with the image that it produces by saturating some pixels while de-saturating other pixels. According to this approach, the image that is produced by saturating some pixels while de-saturating other pixels is a first modified image, while the non-photorealistic image that results from the blending of the original image and the first modified image is a second modified image. In some embodiments, the weighting coefficients that the tool uses to blend the original and first modified images are dependent on the position of the slider. For instance, as the slider moves more to the right or to the left, some embodiments adjust the weighting coefficients to ensure that more of the first modified image is weighted in the blending operation of the original and first modified images. Alternatively, while the slider is closer to the origin, some embodiments select the weighting coefficients to ensure that the original image more heavily influences the second modified image. At both ends of the sliding region, some embodiments completely weight the second modified image towards the first modified image and give no weight to the original image.

In some embodiments, the saturation tool does not receive an image in a color format that has saturation as one of its component color values. Some embodiments use a novel approach to compute the saturation value for each pixel. For example, when the received image is expressed in terms of red, green and blue (RGB) component color values, some embodiments compute the saturation value of a pixel as the difference between the highest component RGB color value of the pixel and the lowest component RGB color value of the pixel.

Based on the identified or computed saturation values of the pixels of a received image, the saturation tool of some embodiments dynamically specifies the scale of the saturation slider tool for the received image. This scale defines the range of values along which the saturation slider can move. To compute this scale, the saturation tool of some embodiments (1) generates a saturation histogram for the image, (2) identifies a saturation value (along the x-axis of the histogram) below which a desired threshold percentile of saturation values reside, and (3) uses this identified value to express the range of the saturation slider. For instance, in some cases, the tool identifies 0.9 as the saturation value below which 95% of the pixel saturation values reside in a particular image.

Accordingly, in these cases, the saturation tool of some embodiments specifies a saturation range of −0.9 to +0.9 for the saturation slider.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an image editing application with a novel color modification slider tool. In some embodiments, this tool adjusts one or more color attributes (e.g., one or more color channels, such as saturation values, chroma values, luminance values, luma values, contrast, etc.) of different pixels differently when moved in one direction, and adjusts one or more color attributes of the same pixel differently when moved in another direction.

Figure 1:
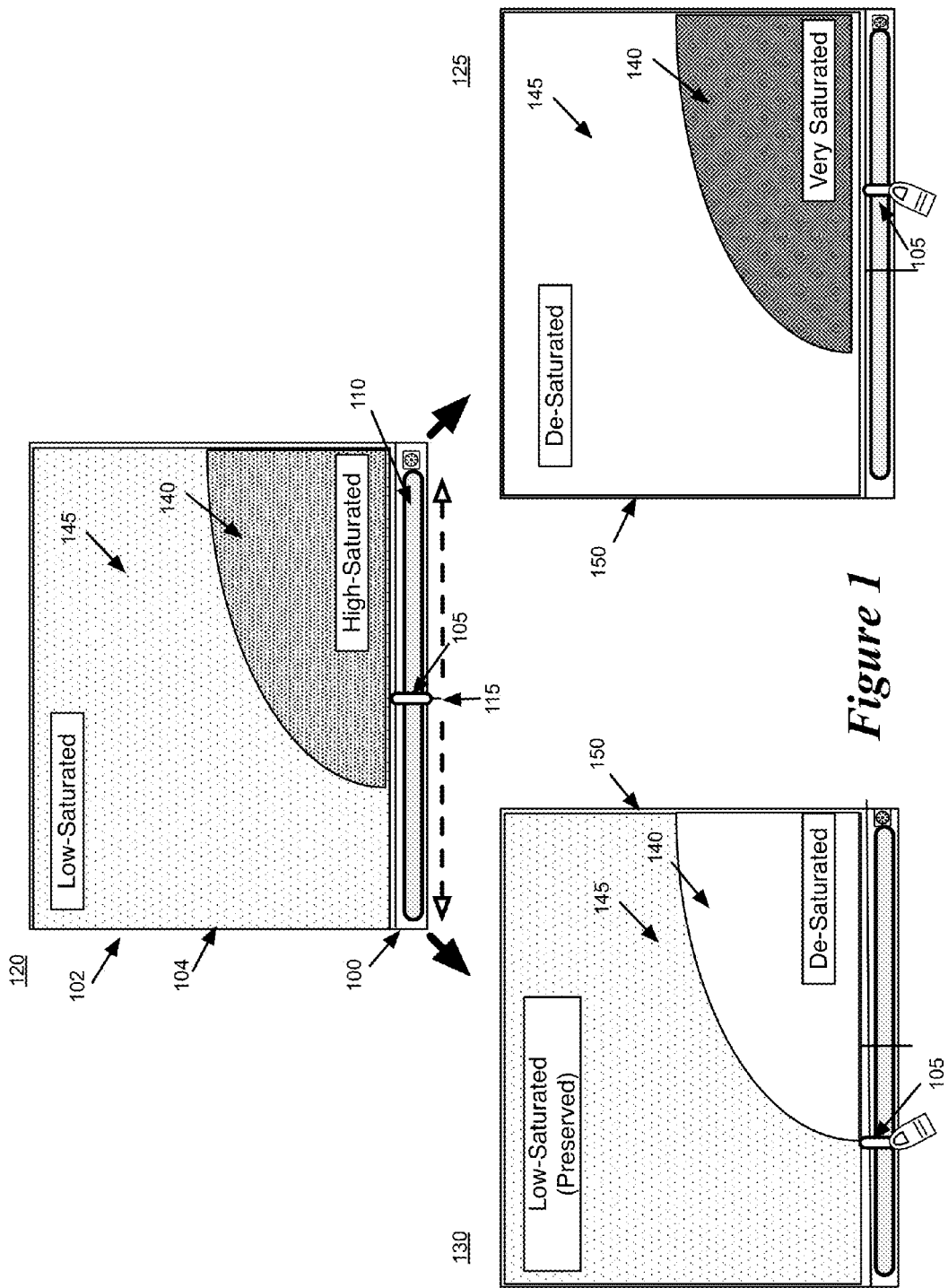
FIG. 1 conceptually illustrates an image editing application with a saturation tool the produces non-photorealistic effects to an image.

For instance, this tool in some embodiments is a novel saturation tool that produces non-photorealistic effects by treating differently the highly saturated and lowly saturated pixels of an image. FIG. 1 illustrates an image editing application with one such saturation tool. The image editing application has a window 104 for displaying images. It also includes a saturation tool 100 that performs either (1) a positive de-saturation effect that de-saturates the low saturated pixels of an image 102 while enhancing the saturation of the high saturated pixels, or (2) a negative de-saturation effect that de-saturates the high saturated pixels of the image while leaving intact or slightly modifying the saturation level of the lowly saturated pixels.

The saturation tool has a slider 105 that slides along a region 110 that has an axis and a central location 115 that serves as the origin of the axis. The slider performs the positive de-saturation effect when it moves to the right from its central location, and performs the negative de-saturation effect when it moves to the left from its central location. Although these two functions produce different results for much of the slider's range, they produce identical results in some embodiments at both ends of the slider's value range (i.e., at slider's origin and the slider's extreme values). In other embodiments, these two functions produce related results at both ends of the slider's value range.

FIG. 1 illustrates these effects in terms of three stages 120, 125, and 130. The first stage 120 illustrates an original image 102 before any modifications by the saturation tool. As shown by this stage, the original image 102 has two different colored regions 140 and 145. To simplify this example, the pixels in each of these two regions 140 and 145 are assumed to have a uniform saturation level, with the pixels in the first region 140 having a uniform high saturation value and the pixels in the second region 145 having a uniform low saturation value.

The second stage 125 illustrates a modified image 150 after the saturation slider 105 has moved to the right and a positive de-saturation effect has been applied to the original image. This effect has produced the non-photorealistic image 150 by making the high saturated pixels of the first region 140 even more saturated and by de-saturating the low saturated pixels of the second region 145. Making the high saturated pixels into very saturated pixels while de-saturating the low saturated pixels produces a non-photorealistic image 150 that looks like a grey scale image with some really colorful pixels (i.e., the very saturated pixels).

The third stage 130 illustrates a modified image 150 after the saturation slider 105 has moved to the left and a negative de-saturation effect has been applied to the original image. This effect produces the non-photorealistic image 150 by de-saturating the high saturated pixels of the first region 140 while leaving the low saturated pixels of the second region 145 unchanged or mostly unchanged. De-saturating the high saturated pixels while leaving the low saturated pixels mostly alone produces the non-photorealistic image 150 that looks like a grey scale image with some faintly colored regions (corresponding to the low saturated pixels).

To treat the high and low saturated pixels of an image differently, the saturation tool of some embodiments implicitly or explicitly classifies the pixels of the image, as further described below. In addition, the saturation tool of some embodiments also implicitly or explicitly classifies the mid saturated pixels of the image, and treats the mid saturated pixels differently than the high and low saturated pixels. In some embodiments, the classification of pixels as high saturated, low saturated and mid saturated depends on the position of the saturation slider along the sliding region. Also, depending on the position of the slider, some embodiments treat different mid saturated pixels differently. For instance, while the slider moves to the right, the mid saturated classified pixels that are more saturated will experience a gradual increase in their saturation that pushes their values closer in value to the saturated pixels, while the mid saturated pixels that are less saturated will experience a gradual decrease in their saturation level that pushes their values closer to the non-saturated pixels. In some embodiments, the amount of the particular increase or decrease in saturation will vary based on the particular amount that the slider has been moved.

In order to produce the non-photorealistic image, the saturation tool of some embodiments blends the original image with the image that it produces by saturating some pixels while de-saturating other pixels. According to this approach, the image that is produced by saturating some pixels while de-saturating other pixels is a first modified image, while the non-photorealistic image that results from the blending of the original image and the first modified image is a second modified image. In some embodiments, the weighting coefficients that the tool uses to blend the original and first modified images are dependent on the position of the slider. For instance, as the slider moves more to the right or to the left, some embodiments adjust the weighting coefficients to ensure that more of the first modified image is weighted in the blending operation of the original and first modified images. Alternatively, while the slider is closer to the origin 115, some embodiments select the weighting coefficients to ensure that the original image more heavily influences the second modified image. At both ends of the sliding region, some embodiments completely weigh the second modified image towards the first modified image and give no weight to the original image.

Section I below further describes how the saturation tool of some embodiments performs the pixel classification and blending operations based on the position of the slider. However, before describing these operations, Section I first describes one manner of invoking the saturation slider in the user interface of the image editing application of some embodiments. Section I also describes a novel way of dynamically defining the scale of the slider based on the color attributes of an image being displayed by the application.

After Section I, Section II describes several modules and processes for presenting the saturation slider and performing the color modification. Section III then describes an image editing and organizing application of some embodiments. Section IV then describes several devices that execute the image editing application of some embodiments.

I. Saturation Slider Tool

A. Invocation and Attributes

Several more detailed embodiments of the invention are provided below. Many of these examples refer to a slider that is part of an image editing application. This application in some embodiments is a standalone application that executes on top of the operating system of a device, while in other embodiments it is part of the operating system. Also, in many of the examples below (such as those illustrated in FIGS. 1, 2, 5, 10, and 14), the device on which the application executes has a touch screen through which a user can interact with the image editing application. However, one of ordinary skill in the art will realize that cursor controllers or other input devices can be used to interact with the sliders and applications shown in these examples for other embodiments that execute on devices with cursors and cursor controllers or other input mechanisms (e.g., voice control).

Figure 2:
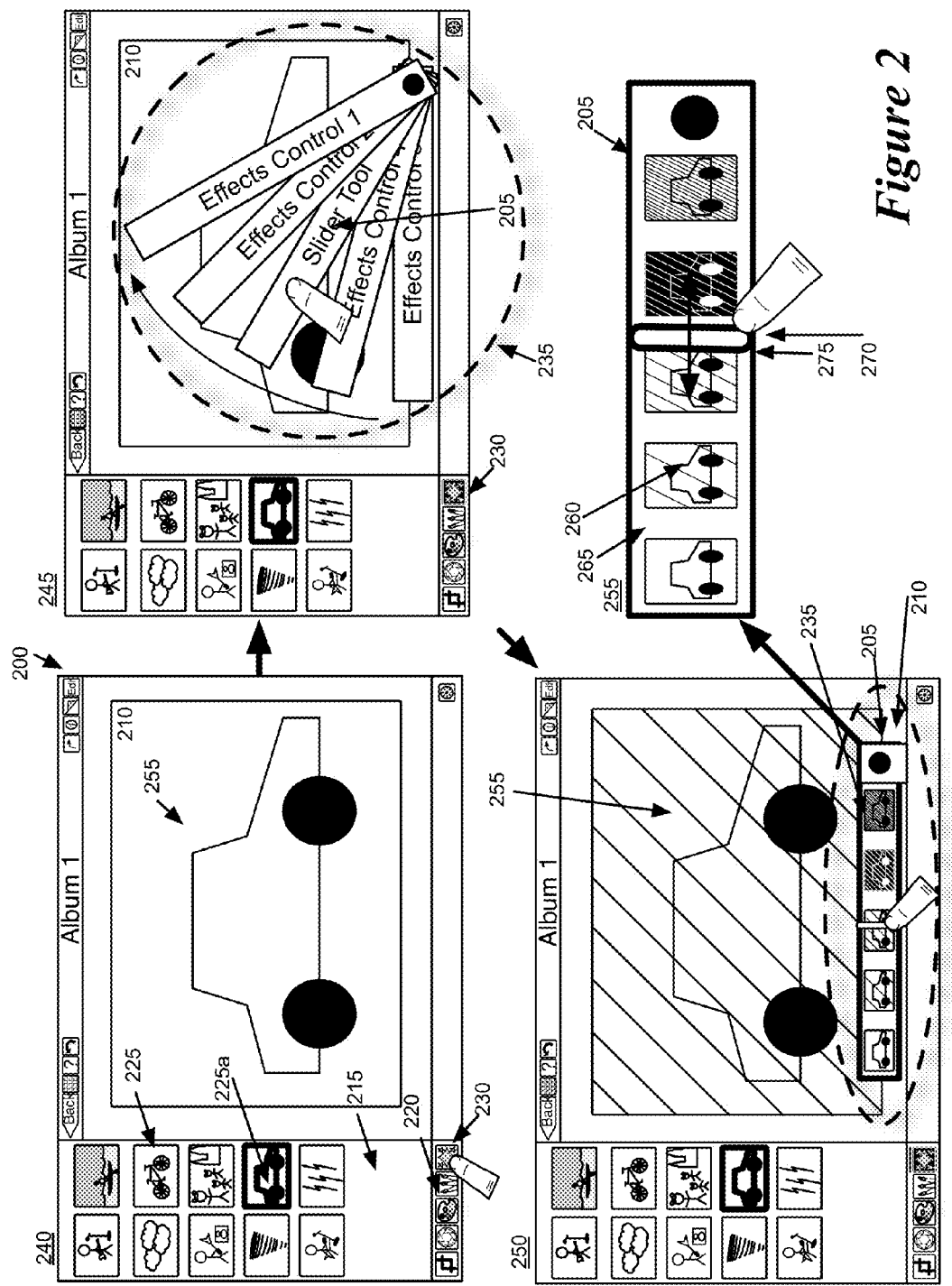
FIG. 2 conceptually illustrates the graphical user interface (GUI) of an image editing application of some embodiments.

FIG. 2 illustrates the graphical user interface of an image editing application 200 of some embodiments of the invention. This figure also illustrates the invocation of a saturation slider tool 205 of this application, and the attributes of this slider tool 205, by reference to three stages 240-250 of operation of the application 200. As shown in FIG. 2, the image-editing application includes a preview display area 210, a thumbnail display area 215, a selectable tools area 220, and the slider tool 205.

The thumbnail display area 215 displays thumbnail images 225 of images in a digital photo album. The user can scroll through these thumbnails (e.g., through directional touch contact with this area) and select any one of the thumbnails (e.g., by touching the location in this area that displays the thumbnail). Selection of a thumbnail in the display area 215 causes the display area 210 to display a higher resolution image (e.g. the actual image, a high-resolution preview of the image, or a higher-resolution thumbnail image) of the selected thumbnail image. In some embodiments, the display area 210 displays the higher resolution image for a user to view and possibly edit the image.

The selectable tools area 220 displays several editing tools that a user can select (e.g., by touching the location in this area that displays the tool) to perform editing operations on an image displayed in the preview display area 210. Examples of such operations include cropping, exposure adjustment, color correction, and a variety of locally or globally applied drawings or effects. As shown in FIG. 2, the selection of an effects icon 230 causes several controls 235 to fan out across the preview display area 210. As further described below, one of these controls is the slider tool 205, which generates a non-photorealistic effect for the previewed image by adjusting the saturation values of the pixels of this images.

The operation of the image editing application 200 will now be described by reference to the three operational stages 240-250 illustrated in FIG. 2. The first stage 240 illustrates the display of an image 255 in the preview display area 210. This image 255 corresponds to the thumbnail 225a, which is highlighted in the stages 240-250 to indicate its selection. The first stage 240 also illustrates the selection of an effects icon 230 through a user's touch of this icon on the device's display screen.

The second stage 245 illustrates that the selection of the effects icon 230 causes several controls 235 to fan out across the bottom portion of the display area 210. In fanning out, each control appears as a card that hingably connects to the other cards at its right end. The fanned out cards are further described in U.S. Provisional Patent Application 61/607,574, filed Mar. 6, 2012; and concurrently filed U.S. patent application Ser. No. 13/629,436, now published as U.S. Publication 2013/0239056, entitled "Fanning User Interface Controls for a Media Editing Application". U.S. Provisional Patent Application 61/607,574 and U.S. patent application Ser. No. 13/629,436, now published as U.S. Publication 2013/0239056, are incorporated herein by reference. The second stage 245 also illustrates the selection of the saturation slider tool 205 through the user's touch of this slider on the device's display screen.

The third stage 250 illustrates that the selection of the saturation slider tool 205 causes all of the fanned out controls 235 to collapse downwards leaving only the saturation slider 235 at the bottom portion of the display area 210. The user can quantify the amount of the saturation effect to apply to an image using the saturation slider tool. As shown in magnification of the saturation slider tool 255 in the third stage shown in this stage, the saturation slider tool 205 includes a slider 270 (e.g., a line or other sliding indicating shape) that a user can select and slide (e.g., through a touch and drag operation as shown) across several thumbnails 260 that are positioned along a sliding region 265. Each thumbnail 260 is a thumbnail of a modified version of the preview displayed image 255 for a particular saturation value that is specified by the position of the thumbnail along the sliding region 265. These thumbnails are generated when the image 255 is initially imported into the application, when this image is displayed for the first time in the preview display area 210, or each time this image is displayed in the preview display area 210. The generation of these thumbnails is further described in the above-incorporated U.S. patent applications.

Figure 3:
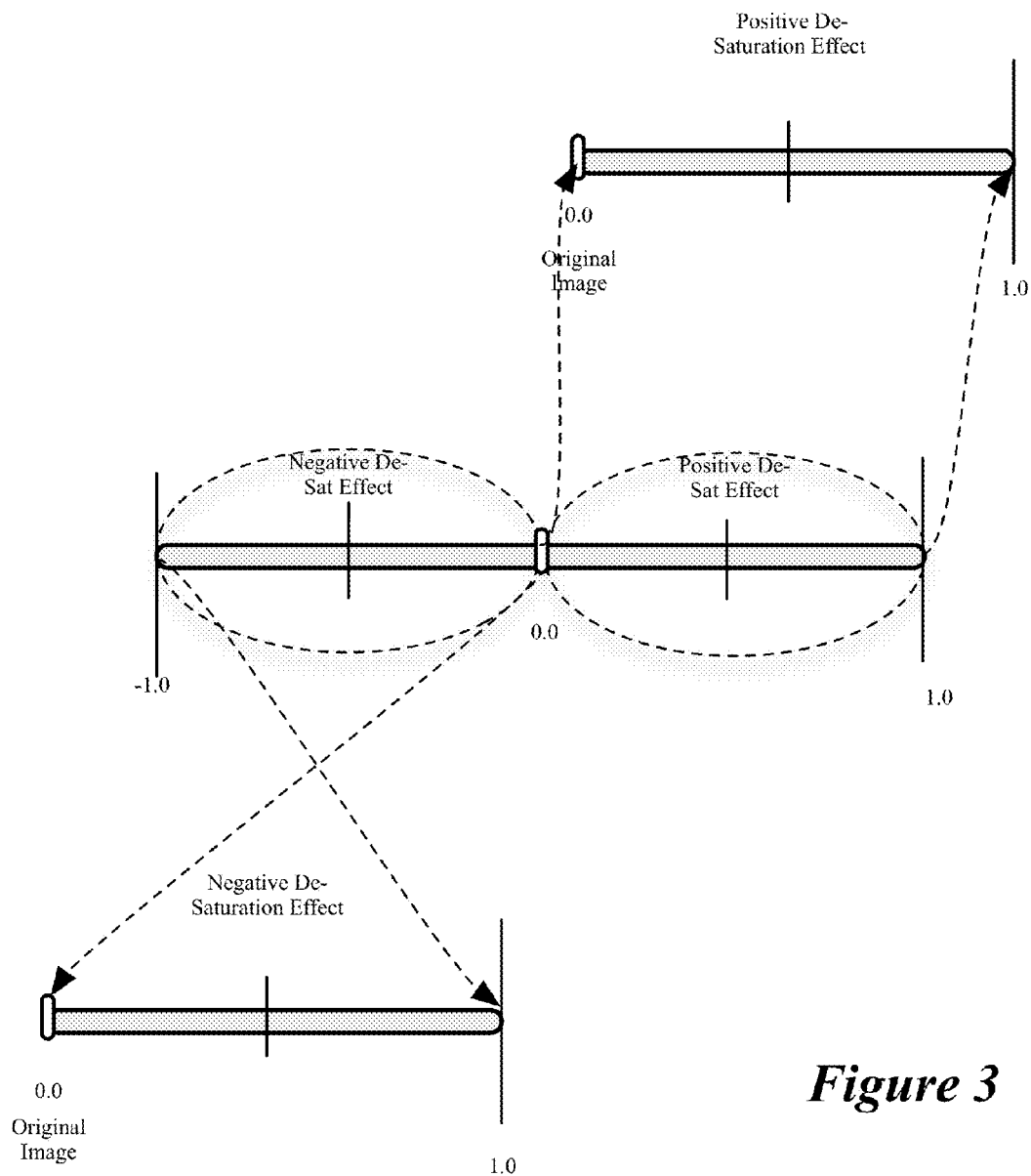
FIG. 3 pictorially represents how each side of the slider tool corresponds to a different de-saturation effect.

The center 275 of the sliding region 265 represents the origin of a saturation axis. The tool generates different effects based on the different directional movement of the slider 270 with respect to the origin. In some embodiments, the slider tool performs a positive de-saturation effect when the slider moves to the right of this origin, and performs a negative de-saturation effect when the slider moves to the left of this origin. FIG. 3 pictorially represents how the right side of the slider corresponds to the positive de-saturation effect while the left side of the slider corresponds to the negative de-saturation effect.

The positive de-saturation effect de-saturates the low saturated pixels of an image 255 while enhancing the saturation of the high saturated pixels. The negative de-saturation effect de-saturates the high saturated pixels of the image while leaving intact or slightly modifying the saturation level of the lowly saturated pixels. Both of these effects produce greyscale like images by de-saturating many of the pixels while leaving the color in some of the pixels. The positive de-saturation effect results in more saturated pixels than the negative de-saturation effect. Also, as further described below, both the positive and negative de-saturation effects at their extremes (which correspond to the slider rightmost and leftmost positions) de-saturate an image completely.

Several more embodiments of the saturation slider are provided below. In order not to complicate the description of these embodiments, the saturation slider is not shown with the thumbnail implementation that is illustrated in FIG. 2. In other words, in the embodiments described below, the saturation slider is simply shown as a geometric shape (e.g., a small rectangle) that slides along a track that is represented by another geometric shape (e.g., a long rectangle). However, one of ordinary skill in the art will realize that the thumbnail implementation of the saturation slider can be used in some or all of the exemplary embodiments described below.

B. Dynamically Defined Scale

Figure 4:
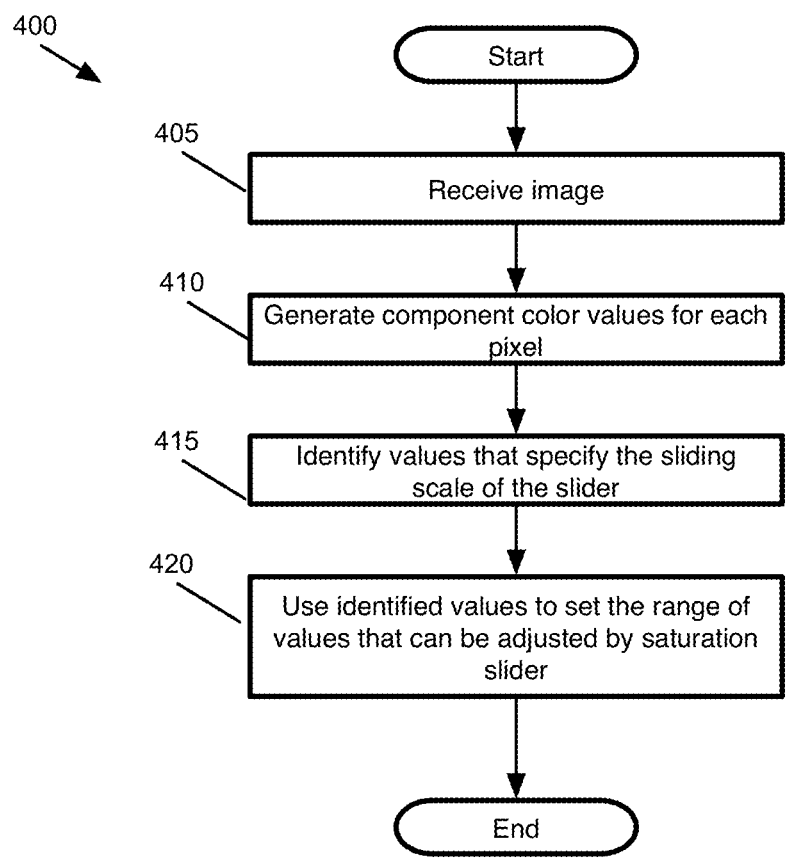
FIG. 4 conceptually presents a process performed by some embodiments for dynamically defining the scale of the slider tool based on the color attributes of an image.

In some embodiments, the particular scale of the slider tool is adjusted for each particular image being viewed in the preview display area 210. FIG. 4 illustrates a process for dynamically defining the scale of the slider tool based on the color attributes of the image being displayed in the preview display area. This process will be described by reference to the examples illustrated in FIG. 5. The examples in these figures are described in three stages 505-515 that show the selection and display of two different images with different color properties, a first image with very bright colors and a second image with plain grey and white colors.

Figure 5:
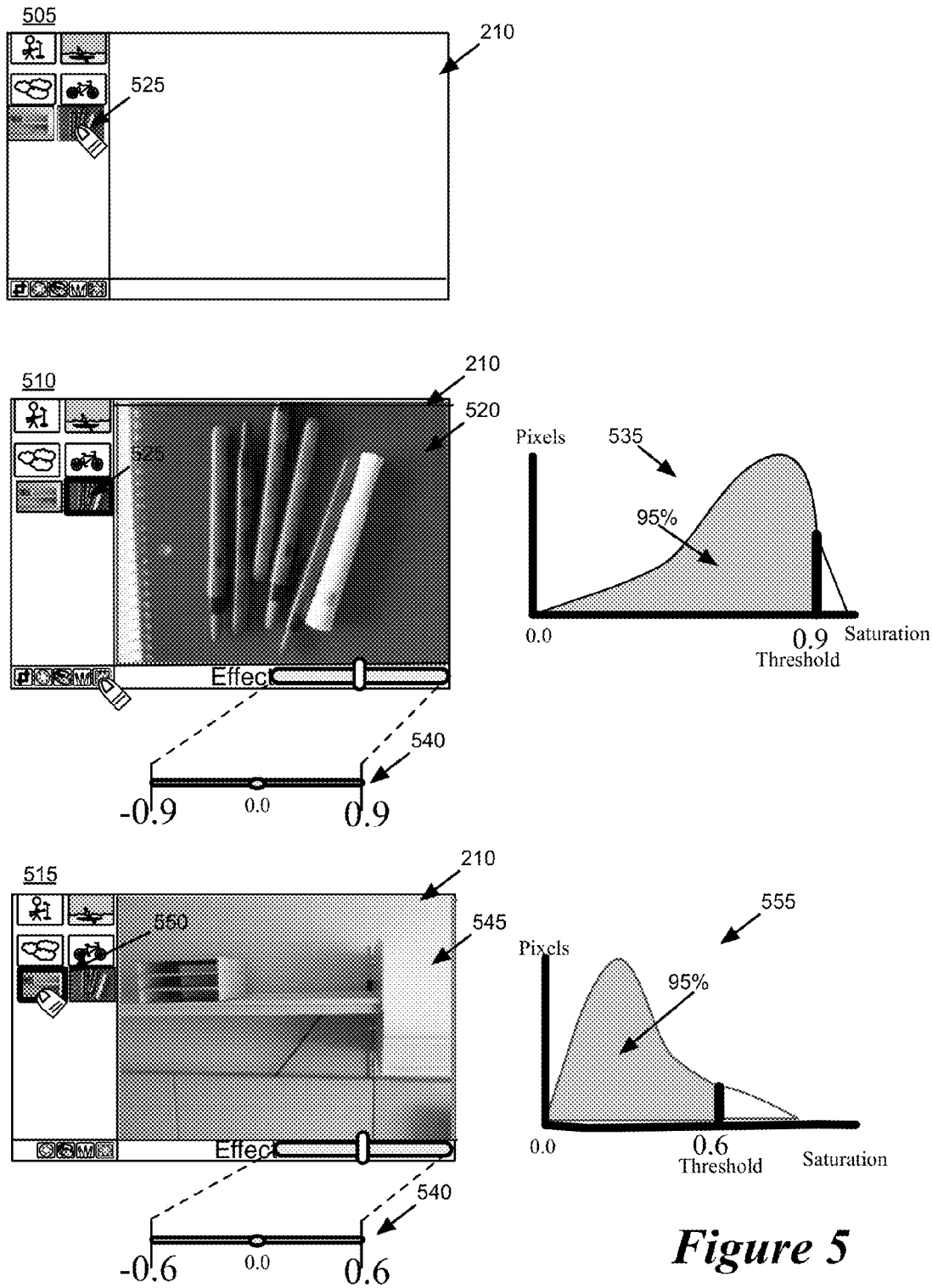
FIG. 5 conceptually illustrates an example of the scaling of the saturation tool for each of two different images with different color properties.

As shown in FIG. 4, the process initially receives (at 405) an image that the user has selected to be displayed in the preview display area. FIG. 5 illustrates an example of the selection of a first image 520. Specifically, in the first stage 505, the preview display area does not display any images, but a user's finger is about to select thumbnail 525 for the first image 520. The second stage 510 then illustrates the first image 520 displayed in the preview display area 210 after the selection of the thumbnail 525.

After 405, the process generates (at 410) one or more new component color values for each pixel in the selected image, if it needs such value(s) for the operation that it has to perform at 415. In some embodiments, the received image has its pixel values defined in the RGB (red, green, blue) color space, while in other embodiments the received image is defined in another color space (such as YCbCr or YUV). The color format of the received image might not be in the right format for the equation (s) that are used to perform the operation at 415. For example, in some embodiments, the process 400 uses an operation at 415 that relies on saturation values of the pixels, but the received image is defined in RGB space. Accordingly, in some of these embodiments, the process 400 computes (at 410) a saturation value for each pixel based on the pixel's RGB value. In some embodiments, the process uses (at 410) a novel approach to computing the saturation value for each pixel. Specifically, in these embodiments, the process computes the saturation value of a pixel as the difference between the highest component RGB color value of the pixel and the lowest component RGB color value of the pixel.

After performing the operation 410 if necessary, the process identifies (at 415) one or more values that specify the sliding scale of the slider. This operation is based on received-image pixel values along one or more color channels, or on pixel values along one or more color channels that the process calculated for the received image at 410, if such a calculation was necessary at 410.

In some embodiments, the operation at 415 entails the process of identifying the saturation value that represents a certain threshold percentile saturation value for all pixels in the image. For instance, in some embodiments, the process identifies the saturation value below which reside the saturation values of 95% of the pixels of the image. For the first selected image 520, the 95% threshold value is 0.9 saturation value, on a saturation scale that ranges from 0 to 1, as illustrated in the second stage 510 of FIG. 5. The saturation histogram 535 of the first image 520 shows that 0.9 is the saturation value that exceeds the saturation value of 95% of the pixels of the first image. Some embodiments compute the saturation histogram and/or threshold percentile saturation value by examining the saturation values of pixels that are within a sub-area of the image (e.g. by identifying a sub-area of an image that contains faces or is near the faces).

Once the process identifies one or more values that specify the sliding scale of the slider, the process 400 uses (at 420) the identified value(s) to set the range of values that can be adjusted by the saturation slider of some embodiments. For the first selected image 520, the process 400 sets −0.9 to +0.9 as the range of the slider 270, as shown by the slider scale 540 in the second stage 510 of FIG. 5. This is because in this example the single 95% value that is identified at 415 is used to compute both ends of the slider's scale. One of ordinary skill will realize that in other embodiments this does not have to be the case. For instance, other embodiments may compute two values that are not each other's numerical opposites as the values that define the ends of the scale.

To further emphasize the dynamic definition of the slider's scale, the third stage 515 of FIG. 5 illustrates the selection of another thumbnail 550 and the display of this thumbnail's associated image 545 in the preview display area 210. The image 545 is a plain dull image with mainly grey and white colors. Accordingly, as shown by the saturation histogram 555, the 95% saturation value for this image is a 0.6 saturation value. As shown in the third stage 515, this value of 0.6 is used to define the slider's scale to a range of −0.6 to +0.6. With this range, the slider cannot generate saturation adjustment values that fall outside of this range.

After 420, the process ends.

Dynamically defining the saturation slider's range based on the selected image's color attributes is beneficial for several reasons. For instance, such a calibration of the sliding scale ensure that a move along the slider will provide more visible onset of the special effect taking place than had the image used a slider with the default range of −1.0 to 1.0. By rescaling the slider for values that are based on the image content, the tool will generate more meaningful and visible onset of the non-photorealistic effect as the slider is moved along the tool. If the slider tool uses only a single scale for all images, the slider tool would generate more abrupt and drastic onset of the non-photorealistic effect to certain images and unnoticeable effects to other images with different color attributes. By re-calibrating the slider tool for each image's attributes, the slider is fine tuned to optimize the effectiveness of the special effect. Recalibrating the sliding range also ensures that the slider produces more granular saturation values when sliding along a fixed sized region for images that have most of their pixels in the lower saturated range. Producing such more granular values for lower saturated images again allows the saturation tool to produce better results for de-saturating such images.

C. Different Classification of Pixels, and Different Treatment of Differently Saturated Pixels, at Different Slider Positions 1. Equations for Pixel Classification and Pixel Value Modifications Equations A-N below illustrate how the saturation slider tool of some embodiments (1) computes the saturation value for each pixel of a received image, (2) implicitly classifies the pixels of the received image based on the computed saturation values of the pixels, and (3) generates a first modified, de-saturated image from the received image based on the computed saturation values and the classification of the pixel. Specifically, Equation A illustrates how the saturation value for a pixel of the image is computed:

$$SAT_i = MaxChan_i - MinChan_i \qquad (A)$$

In this equation, i represents a particular pixel, SAT represents the computed saturation value for pixel i, MaxChan, represents the largest component color value of pixel i, and MinChan, represents the smallest component color value of pixel i. Accordingly, Equation A computes a pixel's saturation value as the difference between the highest and lowest component color values of the pixel. For example, when the received image is defined in red, green, and blue (RGB) color coordinate system, and a pixel's received RGB values are 0.8, 0.5, and 0.2 respectively, the saturation slider tool of some embodiments computes a SAT value of 0.6 for the pixel, as that is the difference between the 0.8 red value and the 0.2 blue value. In some embodiments, the received RGB values are initially received as integer values, e.g., eight bit values that range from 0 to 255. In these situations, the saturation slider tool will first normalize these values to the range between 0 to 1, when it needs the SAT value to be between 0 to 1.

After computing the saturation value for each pixel in the image, the saturation tool of some embodiments calculates, for the image, a saturation threshold value below which resides the saturation values of a certain percentage (e.g., 95%) of the pixels of the image. As described above, this saturation threshold value is used to re-scale the range of the slider tool. This re-scaling is accomplished in some embodiments, by using Equation B below to adjust the slider value SV (that corresponds to the value of the slider's position on the sliding region) by the saturation threshold value $SAT_{TH}$. Specifically, Equation B produces an adjusted slider value ASV by multiplying the slider value SV with the saturation threshold value $SAT_{TH}$.

$$ASV = SV * SAT_{TH} \qquad (B)$$

In Equation B, ASV represents the adjusted slider value corresponding to the re-scaled slider amount of the slider tool received from the user.

By re-scaling this value, the saturation slider tool of some embodiments ensures that a larger number of pixels are classified as mid saturated pixels for images with smaller saturation value thresholds. For instance, as further described below, the saturation slider tool of some embodiments defines mid saturated pixels as pixels that reside in a movable range that is 0.25 wide along most of the slider's scale. As the relative scale of the slider is reduced (e.g., from 0 to 1 in the positive direction to 0 to 0.9), the relative size of the mid saturated pixels increases. As further described below, the mid saturated pixels are the pixels whose saturation values are linearly adjusted by the saturation sliding tool of some embodiments, while the high and low saturated pixels have their saturation values unadjusted or pushed to the extremes. Accordingly, by increasing the number of pixels that are classified as mid saturated pixels for an image that does not have high saturation threshold value (i.e., for an image that is not highly saturated by the slider tool of some embodiments), the slider tool of some embodiments ensures that a smaller number of pixels have their saturation values unchanged or pushed to the extremes. In other words, this approach ensures that "lower" saturated images do not fall completely of a saturation "cliff" the moment the slider is moved in a direction, as this approach ensures that a larger percentage of pixels are classified as mid saturated pixels that have their saturations adjusted linearly. These mid saturated pixels are often in the transition region between the high and low saturated pixels.

From the computed $SAT_i$ value for a pixel i, and the computed adjusted slider value ASV, the slider tool computes a gain for the pixel i. The slider tool uses different gain functions for the positive and negative de-saturation effects. However, the gain function for each of these effects implicitly classifies each pixel in the image as a high saturated pixel, mid saturated pixel, or a low saturated pixel.

For the positive de-saturation effect (i.e., for the movement of the slider to the right from the origin of the sliding axis), the slider tool uses the following Equation C to compute the gain.

$$G_i = \text{MIN}(1.5, \text{MAX}(0.0, 6*(SAT_i - ASV))) \quad (C)$$

This gain function essentially degenerates into the following three Equations D-E for the three different ranges of saturation values, which are (1) the high saturated range when $SAT_i$ is greater than or equal to ASV plus 0.25, (2) the low saturated range when $SAT_i$ is less than or equal to ASV, or (3) the mid saturated range when $SAT_i$ is between ASV and ASV plus 0.25.

$$G_i = 1.5, \text{ when } SAT_i \geq ASV + 0.25; \quad (D)$$

$$G_i = 0, \text{ when } SAT_i \leq ASV; \quad (E)$$

$$G_i = 6*(SAT_i - ASV), \text{ when } ASV < SAT_i < (ASV + 0.25). \quad (F)$$

As shown by Equations C-F, the gain $G_i$ of pixel i (1) is 1.5 when the pixel is treated as a high saturated pixel, (2) is 0 when the pixel is treated as a low saturated pixel, and (3) is generated by the linear Equation F when the pixel is treated as a mid saturated pixel. As further described below, these gains push the values of the high and low saturated pixels to the extremes while linearly modifying the values of the mid saturated pixels. For the mid saturated pixels, the linear Equation F linearly decreases as the slider amount increases by six times the difference between the pixel saturation value $SAT_i$ and the adjusted slider value ASV. This equation will produce gain values between 0 and 1.5, which can either increase or decrease the saturation of the pixel, with 1 corresponding to the original pixel value. In other words, Equation F defines a gain that pushes some of the mid saturated pixels towards the low saturated values while pushing other mid saturated pixels towards the high saturated values. As further described below, other embodiments use different constant values in Equations C-F, or use a different gain function, for the positive de-saturation effect.

For the negative de-saturation effect (i.e., for the movement of the slider to the left from the origin of the sliding axis), the slider tool uses the following Equation G to compute the gain.

$$G_i = \text{MIN}(1.0, \text{MAX}(0.0, -8*(SAT_i - 1 + ASV))) \quad (G)$$

This gain function essentially degenerates into the following three Equations H-J for the three different ranges of saturation values, which for the negative slider direction are (1) the high saturated range when $SAT_i$ is greater than or equal to 1 minus ASV, (2) the low saturated range when $SAT_i$ is less than or equal to 0.875 minus ASV, or (3) the mid saturated range when $SAT_i$ is between (0.875-ASV) and (1-ASV).

$$G_i = 0, \text{ when } SAT_i \geq 1 - ASV; \quad (H)$$

$$G_i = 1, \text{ when } SAT_i \leq 0.875 - ASV; \quad (I)$$

$$G_i = 8*(1 - SAT_i - ASV), \text{ when } (0.875 - ASV) < SAT_i < (1 - ASV). \quad (J)$$

As shown by Equations G-H, the gain $G_i$ of pixel i (1) is 0 when the pixel is treated as a high saturated pixel, (2) is 1 when the pixel is treated as a low saturated pixel, and (3) is generated by the linear equation J when the pixel is treated as a mid saturated pixel. As further described below, these gains push the values of the high saturated pixels towards the mid channel value (to the "de-saturation" extreme, leave the values of the low saturated pixels unchanged, and linearly modify the values of the mid saturated pixels. For the mid saturated pixels, the linear Equation J linearly decreases as the slider amount increases by eight times the value that is derived by subtracting the pixel's saturation value $SAT_i$ and the adjusted slider value ASV from 1. This equation will produce gain values between 0 and 1, which linearly decrease the saturation of the mid saturated pixels. In other words, Equation J defines a gain that de-saturates all of the mid saturated pixels, but de-saturates some of them (those with smaller gains) more. As further described below, other embodiments use different constant values in Equations G-J, or use a different gain function, for the negative de-saturation effect.

After calculating the particular gain value that will be applied to a particular pixel in the image, the slider tool produces a first modified de-saturation image by adjusting the pixel's component color values (e.g., RGB values) according to the classification and gain value for that pixel. The following Equations K-M illustrate how the saturation slider tool of some embodiments computes a new set of $R_{Ni} G_{Ni} B_{Ni}$ values from an original set of $R_{Oi} G_{Oi} B_{Oi}$ values for a pixel i.

$$R_{Ni} = \text{MidChan}_i + G_i*(R_{Oi} - \text{MidChan}_i) \quad (K)$$

$$G_{Ni} = \text{MidChan}_i + G_i*(G_{Oi} - \text{MidChan}_i) \quad (L)$$

$$B_{Ni} = \text{MidChan}_i + G_i*(B_{Oi} - \text{MidChan}_i) \quad (M)$$

In the above Equations K-M, $\text{MidChan}_i$ is the middle component RGB color value of pixel i among the three color channels. In some embodiments, the $\text{MidChan}_i$ value is computed as:

$$\text{MidChan}_i = R_{Oi} + G_{Oi} + B_{Oi} - \text{MaxChan}_i - \text{MinChan}_i \quad (N)$$

As can be seen from Equations K-M, the gain has no effect on the component color value of pixel i that is this pixel's mid channel value because the difference value that is multiplied by the gain for this component color value will be zero. For the other two channels that are not the mid channel value for pixel i, the gain can either increase or decrease their values. When the gain is zero, Equations K-M illustrate that all three component color values are set to the $\text{MidChan}_i$ value. Setting all of the color component channels equal to the mid channel value forces the pixel to be completely de-saturated with a saturation value of 0.

When the gain is 1, Equations K-M illustrate that all three component color values are set to the their original values. Equations K-M also illustrate that the component color value of pixel (1) increases when this value is greater than the mid channel value $\text{MidChan}_i$ and the gain is larger than 1, (2) decreases when this value is less than the mid channel value $\text{MidChan}_i$ and the gain is larger than 1.5, (3) increases when this value is less than the mid channel value $\text{MidChan}_i$ and the gain is between 0 and 1, and (4) decreases when this value is greater than the mid channel value $\text{MidChan}_i$ and the gain is between 0 and 1.

Although the above-described equations have been described by reference to specific formats and constant values, one of ordinary skill in the art will understand that other embodiments will use other formats and other constant values for these equations. Furthermore, instead of having implicit classification in computing the gain values, some embodiments examine the pixel saturation value and select a completely different pixel adjustment function instead of picking a different gain value for the function.

2. Examples of Pixel Value Adjustments

To illustrate the computations of Equations K-M, two sets of examples will now be described by reference to FIGS. 6 and 7, which describe adjustments to high, low and mid saturated pixels respectively for the positive de-saturation effect and negative de-saturation effect. In each of these figures, the de-saturation effect on each pixel is illustrated in two stages, a first stage that illustrates the original component color values of the pixel and a second stage that illustrates the modified component color values for the pixel, where the modified values represent the corresponding pixel's value in the first modified de-saturated image. Also, above each stage in each of these figures the slider tool is illustrated to show the location of the slider that resulted in the pixel values of that stage. To simplify this example, the slider range has not been adjusted based on the saturation threshold value of the image being modified. In addition, in these figures, each pixel's values are RGB values that are placed on a common scale 600 that ranges between 0 and 1.

Figure 6:
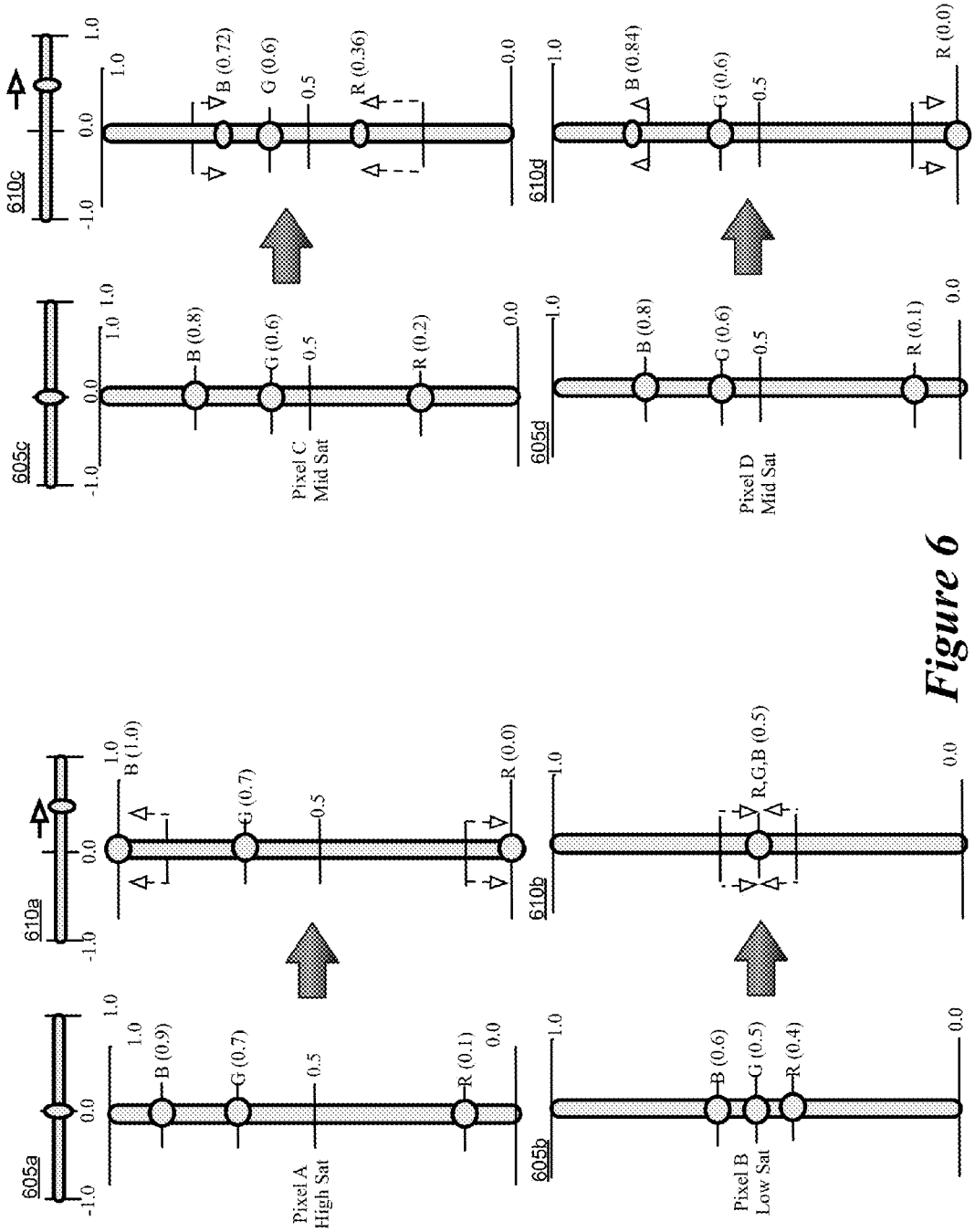
FIG. 6 conceptually illustrates the different modifications that are applied to different pixels of an image during the positive de-saturation effect.

FIG. 6 illustrates the different modifications that are applied to different pixels of an image during the positive de-saturation effect. This figure illustrates four types of pixels, which are a high saturated pixel A, a low saturated pixel B, a mid saturated pixel C and another mid saturated pixel D. The two mid saturated pixels C and D differ as one of them has a gain between 1 and 1.5 and the other has a gain between 0 and 1.

Pixel A is a high saturated pixel with a saturation value of 0.8 (derived by subtracting its red value of 0.1 from its blue value of 0.9), pixel B is a low saturated pixel with a saturation value of 0.2 (derived by subtracting its red value of 0.4 from its blue value of 0.6), pixel C is a mid saturated pixel with a saturation value of 0.6 (derived by subtracting its red value of 0.2 from its blue value of 0.8), and pixel D is a mid saturated pixel with a saturation value of 0.7 (derived by subtracting its red value of 0.1 from its blue value of 0.8).

For each of these pixels, its corresponding first stage 605a-605d illustration show their initial pixel values from which their saturation values are derived. Each of these first stages also shows that the saturation slider's position for each of these pixels is at the origin of the sliding region.

In the second stage 610a-610d, the user has moved the slider tool to the right by an amount 0.5 to perform a positive de-saturation effect. For this position of the slider, the gain for pixel A is computed to be 1.5 using the equations described above. This has the effect of pushing the blue and red color component values of pixel A away from its green mid-channel value, thereby increasing the pixel's saturation value. Here, the saturation reaches the limit of 1 and the pixel is completely saturated after the slider has moved by 0.5.

The opposite effect is achieved for pixel B. With a saturation value of 0.2, the gain of this pixel is computed to be 0 for the slider's movement to the 0.5 position. This gain forces the blue and red color component channels of this pixel to be set to the mid channel green value, and thereby completely de-saturates the pixel. This modified pixel has a saturation value of 0.

Pixels C and D illustrate that during the positive de-saturation effect, certain mid saturated pixels will experience an increase in their saturation value and other mid saturated pixels will experience a decrease in their saturation value. Pixel C in this situation has a saturation value of 0.6, which when used in the gain computation, results in a gain value of 0.6, which is between 0 and 1 corresponding to a decrease in saturation. This causes its blue value to decrease to 0.72 and its red value to increase to 0.36, which in turn decreases its saturation value, from 0.6 to 0.36. Pixel D has an initial saturation value of 0.7, which results in a gain value of 1.2, which is greater than 1 corresponding to an increase in saturation. This gain value increases its blue value to 0.84 and reduces its red value to 0, which thereby increases its saturation value from 0.7 to 0.84.

Figure 7:
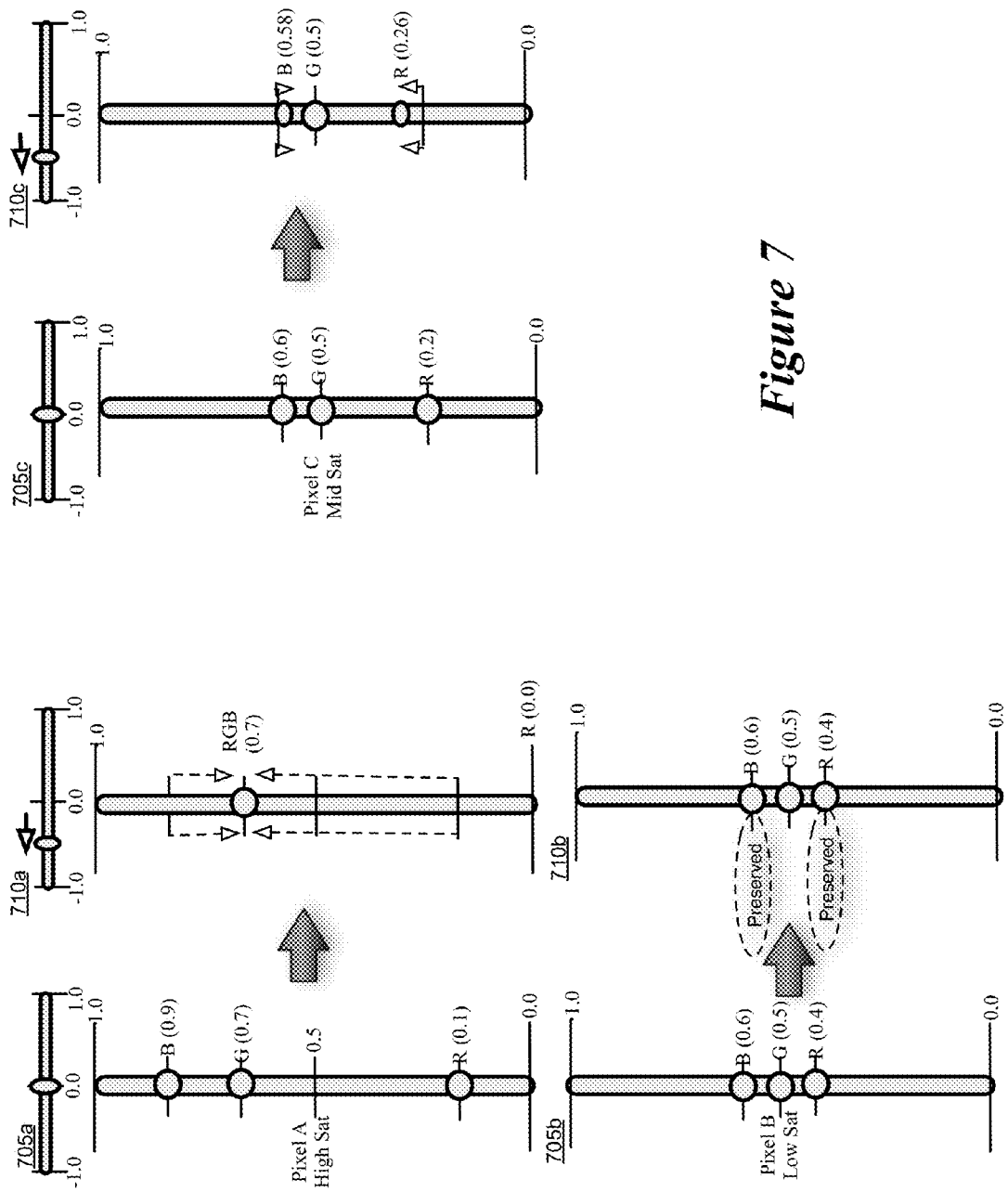
FIG. 7 conceptually illustrates the different modifications that are applied to different pixels of an image during the negative de-saturation effect.

FIG. 7 illustrates the different modifications that are applied to different pixels of an image during the negative de-saturation effect. This figure illustrates three types of pixels, which are a high saturated pixel A, a low saturated pixel B, and a mid saturated pixel C. Pixel A is a high saturated pixel with a saturation value of 0.8 (derived by subtracting its red value of 0.1 from its blue value of 0.9), pixel B is a low saturated pixel with a saturation value of 0.2 (derived by subtracting its red value of 0.4 from its blue value of 0.6), pixel C is a mid saturated pixel with a saturation value of 0.4 (derived by subtracting its red value of 0.2 from its blue value of 0.6).

For each of these pixels, the corresponding first stage 705a, 705b, or 705c illustration show the initial pixel values from which their saturation values are derived. Each of these first stages also shows that the saturation slider's position for each of these pixels is at the origin of the sliding region.

In the second stages 710a-710c, the user has moved the slider tool to the left by an amount of −0.5 to perform a negative de-saturation effect. However, as described above, the slider tool corresponds the negative values of the slider to positive values for calculation purposes by using the absolute value of the slider movement, which is 0.5. For this position of the slider, the gain for pixel A is computed to be 0 using the equations described above. This gain forces the blue and red color component channels of this pixel to be set to the mid channel green value, and thereby completely de-saturates the pixel. This modified pixel has a saturation value of 0.

A different effect is achieved for pixel B. With a saturation value of 0.2, the gain of this pixel is computed to be 1 for the slider's movement to the −0.5 position, which as described is a slider position of 0.5 using the absolute value. This gain preserves the blue and red color component channels of this pixel with their original values, and thereby does not modify the pixel. This modified pixel remains at a saturation value of 0.2.

Pixels C illustrates that during the negative de-saturation effect, the mid saturated pixels will experience a decrease in their saturation value. Pixel C in this situation has a saturation value of 0.4, which when used in the gain computation, results in a gain value of 0.8, which is between 0 and 1 corresponding to a decrease in saturation. This causes its blue value to decrease to 0.58 and its red value to increase to 0.26, which in turn decreases its saturation value, from 0.4 to 0.32.

In each example illustrated above, the gain has had no effect on the component color value of each pixel's mid channel value because Equations K-M preserve the mid channel values of a pixel. This approach is different than prior pixel saturation adjustments, which modified all three color channels. Some embodiments do not adjust the mid channel values because such an approach generally does a better job of preserving the skin tones. In some cases, two color channels for a pixel will be equal to each other. Some embodiments treat both of these channels as the mid channel value for purposes of Equations K-M. In this situation, Equations K-M adjust only the remaining color channel while preserving the other two color channel values.

3. Example of Different Treatment of High, Mid, and Low Saturated Pixels

Figure 8:
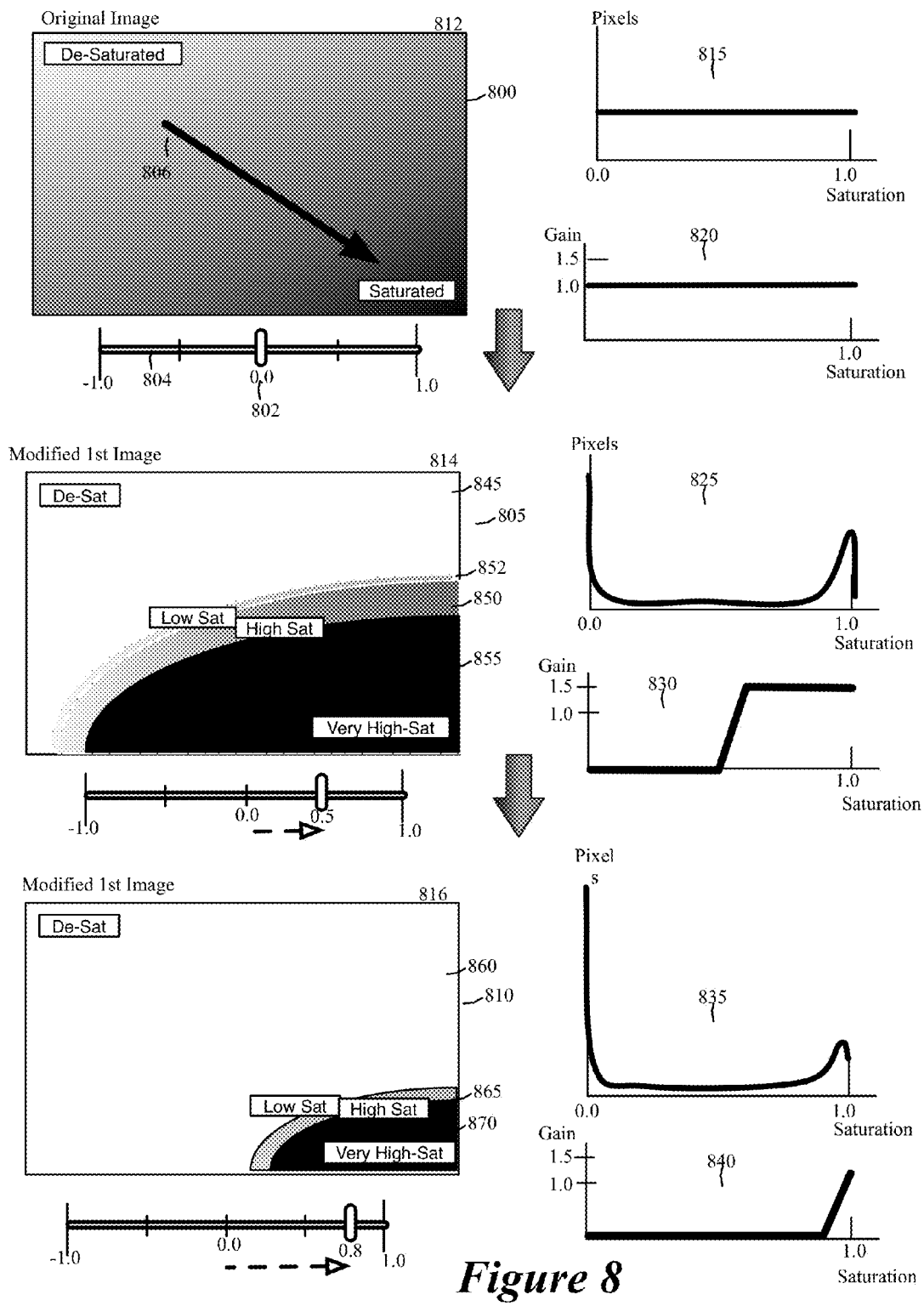
FIG. 8 conceptually illustrates the positive de-saturation effect as applied to an image with certain unique characteristics.
Figure 9:
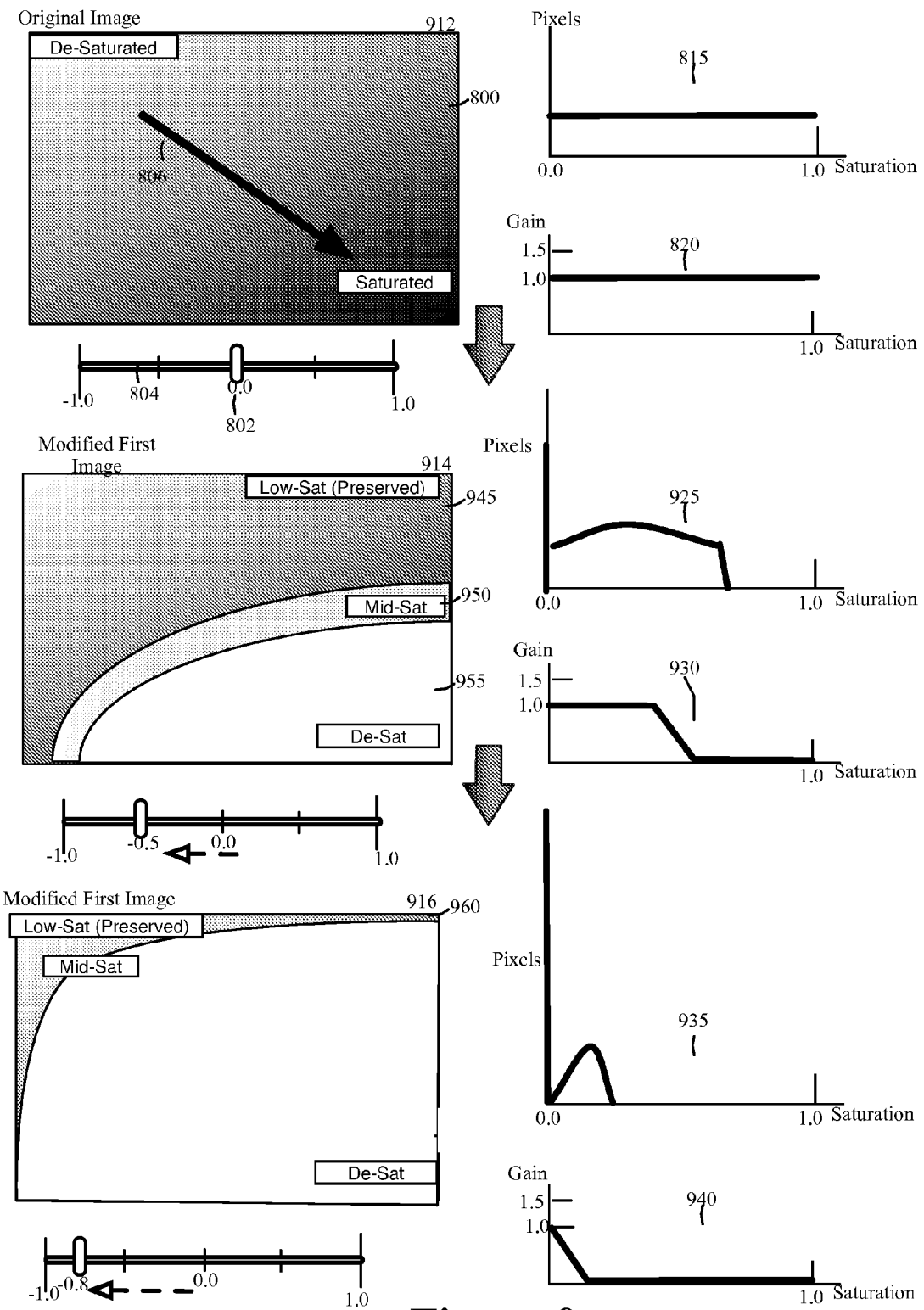
FIG. 9 conceptually illustrates the negative de-saturation effect as applied to an image with certain unique characteristics.

FIGS. 8 and 9 illustrate how the positive and negative de-saturation effects implicitly classifies and treats differently the high saturated, mid saturated, and low saturated pixels of an image and how these classifications change as the saturation slider tool is adjusted. In each of these figures, the de-saturation effect on the image 800 is illustrated in three stages 812, 814 and 816. The image 800 is not an ordinary picture of something in the real world, but rather has been generated to best illustrate the pixel classification process. This image 800 has a saturation gradient that traverses across the image. The image 800 has its saturation gradient result in the lowest saturation pixels located at the top left corner of the image 800 and the most saturated pixels located at the lower right corner of the image 800 with a gradual increase in saturation from the top left corner to the bottom right corner in the direction of the arrow 806 illustrated on the image 800. In these figures, the darker the region of the image 800, the higher the saturation value of the pixels in that region.

The first stage 812 or 912 in each of these figures illustrates the original image 800 before any modification by the slider tool. The second stages 814 and 914 illustrate the effect of a first modification to the original image 800 based on the movement of the slider 802 to a first new position, while the third stages 816 and 916 illustrate a second modification to the image based on the movement of the slider 802 to a second new location. Below each stage in each of these figures, the slider tool is illustrated to show the location of the slider 802 that resulted in the image saturation classifications of that stage. To simplify this example, the slider range has not been adjusted based on the saturation threshold value of the image being modified. In addition, each stage also illustrates the image's saturation histogram 815, 825, 835, 925 and 935 and a graph of the gain values 820, 830, 840, 930, and 940 being applied to the range of saturation values to produce that image.

FIG. 8 illustrates the positive de-saturation effect as applied to the image 800 with the unique saturation characteristics defined for these figures. The first stage 812 illustrates the initial pixel saturation values of the original image 800, with the light colors in the top left corner corresponding to the lowest saturation pixels and dark grey and black colors at the bottom right corner corresponding to the most saturated pixels.

The corresponding image saturation histogram 815 for the original image 800 shows a uniform distribution of saturation values with an equal amount of pixels at each saturation value from 0 to 1. This image 800 contains an increasing saturation gradient of pixels that are disbursed throughout the image to produce an equal amount of pixels at the various saturation values for the entire image 800. The gain table 820 illustrates that the gain being applied to the original image 800 is currently equal to 1, since at this point, no image processing has been applied to the image 800. Furthermore, a uniform gain of 1 for all pixels corresponds to the slider 802 being located at the origin and thus producing the original image 800 with zero positive or negative de-saturation effect being applied.

In the second stage 814, the user has moved the slider tool 802 to the right by an amount of 0.5 to perform the positive de-saturation effect. For this position of the slider, the gain function 820 has changed for each different implicit classifications of pixels, where each pixel is classified according to its saturation value relative to the adjusted slider amount, as described with respect to Equations C-F above. Based on these equations, the high saturated pixels of the original image receive a maximum gain of 1.5, the low saturated pixels in the original image receive a gain of 0, and the mid saturated pixels of the original image receive a gain ranging between 0 and 1.5. Irrespective of whether these pixels are explicitly or implicitly classified, these three regions 845, 850, and 855 exist because the saturation slider tool treats these pixels within these regions differently. As further described above, the high saturated and low saturated pixels are pushed to the extremes while the mid saturated pixels are linearly modified.

The area of the image saturation regions has changed as well to reflect the new pixel saturation values upon modifying each pixel in the original image according to its particular gain value. As the slider tool 802 has moved by 0.5, the pixels that were previously located towards the lowest saturation region of the original image have now become completely de-saturated 845 as a result of the gain function applying a 0 gain value to these pixels according to the gain calculations. The high saturated pixels in the original image are now classified as very high saturated pixels 855 to reflect the gain of 1.5 that was applied to their original values, which increased their saturation values. Certain pixels that were originally located in a first mid saturation region in the original image are now classified as low saturated pixels 852 to reflect different gain values ranging between 0 and 1, that all have the effect of decreasing these pixel's original saturation values. Certain pixels that were originally located in a different mid saturation region of the original image, with higher saturation values than those in the first mid saturation region in the original image, are now classified as high saturated 850 pixels to reflect a gain of between 1 and 1.5, which increased their original saturation values.

The image saturation histogram 825 reflects these various pixel modifications to the original image, with a significant increase in the number of pixels that have a zero saturation value corresponding to the low saturated pixels in the original image that received the gain of 0. The saturation histogram 825 reflects an increase in the number of pixels with very high saturation values corresponding to the high saturated pixels in the original image that received a gain of 1.5. The mid saturated pixels are disbursed between the high and low saturated 850 category and represent a smaller portion of the final image, as reflected by the classification equations described above.

In the third stage 816, the user has moved the slider tool 802 further to the right, by a total amount of 0.8, to generate a greater positive de-saturation effect. Now, based on the implicit pixel classification equations and the new slider value, only the portion of the image with saturation values that exceed an even higher saturation value will be classified and treated as high saturated pixels. The gain function reflects that a 0 value will be applied to all of the pixels except those with saturation values at or near 1 on the saturation scale. This has the effect of completely de-saturating all of the pixels below this threshold, leaving only the brightest, most saturated pixels with any color. As reflected in the image, only a small portion of the image remains classified as very saturated 870, with a comparably small band of mid saturation pixels 865, comprising low and high saturated pixels that received a gain of between 0 and 1.5 to reflect the slope of the gain function. However, the majority of the pixels in this stage, having previously been implicitly classified as low saturated through the gain function equations, have been completely de-saturated 860 to reflect the gain of 0. The image saturation histogram 835 for this third stage now reflects an even larger number of pixels at the zero saturation point, with a relatively small group of very high saturated pixels remaining in the image.

In the situation where the slider 802 is moved to the limit or 1.0 position on the slider scale, the pixel classification equations would implicitly classify all of the pixels in the original image as low saturated pixels and thereby apply a 0 gain to these pixels which would de-saturate the entire image. This has the effect of modifying an original image 800 to reflect only its grey scale color values with no saturation in any pixel.

FIG. 9 illustrates the negative de-saturation effect as applied to the image 800 with the unique saturation characteristics defined for these figures. The first stage 912 illustrates the initial pixel saturation values of the original special image 800, with the light colors in the top left corner corresponding to the lowest saturation pixels and the dark grey and black colors at the bottom right corner of the image corresponding to the most saturated pixels.

The corresponding image saturation histogram 815 for the original image shows a uniform distribution of saturation values with an equal amount of pixels at each saturation value from 0 to 1. As mentioned by reference to FIG. 8, this image 800 contains an increasing saturation gradient of pixels that are disbursed throughout the image to produce an equal amount of pixels at each of the various saturation values for the entire image. As in FIG. 8, the gain table 820 illustrates that the gain being applied to the original image 800 is currently equal to 1, since at this point, no image processing has been applied to the image 800. Furthermore, as in FIG. 8, a uniform gain of 1 for all pixels corresponds to the slider 802 being located at the origin and thus producing the original image 800 with zero negative de-saturation effect being applied.

In the second stage 914, the user has moved the slider tool 802 to the left by an amount of 0.5 to perform the negative de-saturation effect. For this position of the slider 802, the gain function 930 has changed for each different implicit classifications of pixels, where each pixel is classified according to its saturation value relative to the adjusted slider amount, as described with respect to Equations G-J above. Based on these equations, the high saturated pixels of the original image 800 receive a minimum gain of 0, the low saturated pixels in the original image 800 are preserved and receive a gain of 1, and the mid saturated pixels of the original image 800 receive a gain ranging between 0 and 1. Irrespective of whether these pixels are explicitly or implicitly classified, these three regions 945, 950, and 955 exist because the saturation slider 802 tool treats these pixels within these regions differently. As further described above, the high saturated pixels are pushed towards the de-saturation extreme and become completely de-saturated, the low saturated pixels are preserved and retain their original pixel values, and the mid saturated pixels are linearly modified with decreasing saturation values.

The area of the image saturation regions has changed as well to reflect the new pixel saturation values upon modifying each pixel in the original image 800 according to its particular gain value. As the slider tool 802 has moved by 0.5 in the negative direction, the pixels that were previously located towards the lowest saturation region of the original image have been preserved as a result of the gain function using a 1 gain value for these pixels 945 in the gain calculations. The pixels that were originally located in a mid saturated region in the original image 800 are now classified as low saturated 945 to reflect different gain values ranging between 0 and 1, that all have the effect of decreasing these pixel's original saturation values. The high saturated pixels in the original image are now completely de-saturated pixels 955 to reflect the gain of 0 that was applied to their original values, which decreased their saturation values to 0.

The image saturation histogram 925 reflects these various pixel modifications to the original image 800, with a significant increase in the number of pixels that have a zero saturation value corresponding to the high saturated pixels in the original image 800 that received the gain of 0. The saturation histogram 925 shows a slight increase in the number of pixels with low saturation values but this portion of the histogram closely resembles the low saturation portion of the original histogram because the low saturated pixels have been preserved and the new saturation histogram reflects only the additional mid saturated pixels in the original image 800 that received a gain value of between 0 and 1 which implicitly re-classified their status to low saturated pixels 945.

In the third stage 916, the user has moved the slider tool 802 further to the left, negative direction, by a total amount of 0.8, to generate a greater negative de-saturation effect. Now, based on the implicit pixel classification equations and the new slider value, only the portion of the image with saturation values that are less than this lower saturation value will be classified and treated as low saturated pixels 960. The gain function reflects that a 0 value will be applied to all of the pixels besides those with saturation values at or near 0 on the saturation scale. This has the effect of completely de-saturating all of the pixels above this threshold, leaving only the dullest, least saturated pixels with any saturation. As reflected in the image, only a small portion of the image remains classified as low and mid saturated 960, to reflect the pixels that received a gain of between 0 and 1 to reflect the slope of the gain function. However, the majority of the pixels in this stage, having previously been implicitly classified as high saturated through the gain function equations, have been completely de-saturated to reflect the gain of 0. The image saturation histogram 935 for this third stage 916 now reflects an even larger number of pixels at the zero saturation point, with a relatively small group of low and mid saturated pixels remaining in the image.

In the situation where the slider 802 is moved to the limit or 1.0 position on the left end of the slider scale, the pixel classification equations would classify all of the pixels in the original image as high saturated pixels and thereby apply a 0 gain to all of the pixels in the image, which would effectively de-saturate the entire image. This has the effect of modifying an original image to reflect only its grey scale color values with no saturation in any pixel. By completely de-saturating an image at both limits for the positive de-saturation effect and the negative de-saturation effect, the slider tool appears to be achieving the same result at either end of the slider scale. A difference between the negative and positive de-saturation effect being the particular order by which the pixels in an image are de-saturated, from first the low saturated to high saturated for the positive de-saturation effect, and from first the high saturated to low saturated for the negative de-saturation effect.

Figure 10:
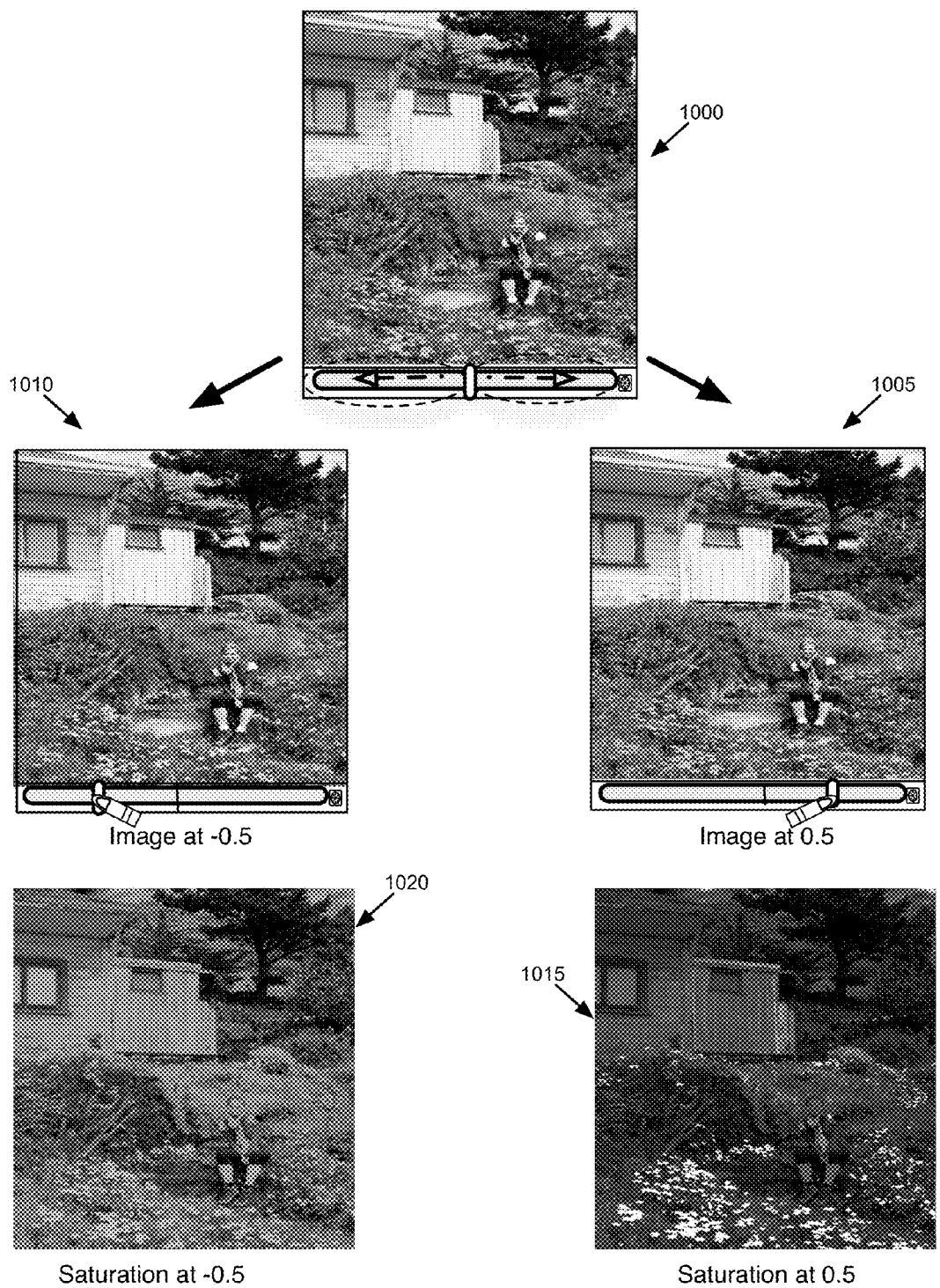
FIG. 10 conceptually illustrates the positive and negative de-saturation effect as applied to an ordinary color image.

FIGS. 8 and 9 illustrate the positive and negative de-saturation effect on an abstract image with unique saturation characteristics. FIG. 10 illustrates the application of these effects on an ordinary color image 1000. However, because the color images illustrated in FIG. 10 are shown in a black and white format, the de-saturation effects are not easily recognized on the modified images 1005 and 1010 that result from the application of these effects on the image 1000. In order to help further visualize these results, FIG. 10 also provides saturation bitmap images 1015 and 1020 below each modified image 1005 and 1010. In the saturation bitmap, each pixel's saturation value is scaled to a corresponding grey scale value from 0 to 1, with a black pixel corresponding to a completely de-saturated pixel with a saturation value of 0, a white pixel corresponding to a fully saturated pixel with a saturation value of 1, and the spectrum of grey values corresponding to the range of pixel saturation values between 0 and 1. The saturation bitmap image helps highlight which pixels are the most saturated in each of the modified images 1005 and 1010.

FIG. 10 illustrates the original image before any modification by the slider tool. The image displays an outdoor setting with a variety of distinct colors and regions. Primarily, the image illustrates numerous bright yellow and orange flowers scattered throughout a lush green landscape, with the flowers primarily located in the bottom foreground of the image. The colorful flowers in the image correspond to the highly saturated pixels in the image. The remaining regions of the image illustrate relatively less colorful features, including an abundance of different shades of green brush and trees, a faded cream house and a person wearing dark clothes with light skin. In contrast to the bright yellow flowers, these less colorful features appear to contain relatively average to low saturation values.

FIG. 10 illustrates the modified image 1005 that results from the application of the positive de-saturation operation to the original image 1000 when the slider moves to a value of 0.5. This modified image 1005 illustrates the different treatment of the color regions of the original image. The positive de-saturation effect has further enhanced the colors of the bright yellow flowers, which now stand out in the image in stark contrast to the remainder of the colors in the image, which have now been mostly de-saturated. The once lush green brush and trees in the original image are now a grey landscape with small hints of green. The cream house has been faded even further to a shade of white.

The saturation bitmap 1015 further illustrates the positive de-saturation effect. This bitmap shows the flowers in the original image as bright white flowers, corresponding to saturation values at or near 1. The saturation for these values was pushed to the extreme value of 1 because these pixels were classified as high saturated pixels that had their saturation pushed to the maximum saturation value. The remainder of the bitmap image displays shades of dark grey and black that correspond to saturation values between 0 and 1. These remaining regions in the bitmap correspond to the regions in the original image 1005 that were less colorful. These regions were treated as low and mid saturated pixels. The low saturated pixels were pushed to the value of 0 in the modified image 1005. Some of the mid saturated pixels were also pushed to lower saturation values as their gain values were below 1, while a few mid saturated pixels were pushed to higher saturation values as their gain values were above 1.

FIG. 10 also illustrates the modified image 1010 that results from the application of the negative de-saturation operation to the original image 1000 when the slider moves to a value of −0.5. This modified image 1010 illustrates the different treatment of the color regions of the original image. The negative de-saturation effect has de-saturated the colors of the bright yellow flowers, which no longer stand out in the image in contrast to the remainder of the colors in the image, which have now been either de-saturated or maintained at their low saturation state.

The saturation bitmap 1020 further illustrates the negative de-saturation effect. This bitmap shows the flowers in the original image as dull white flowers, corresponding to their reduced saturation values. The saturation for these values was pushed lower because these pixels were classified as mid or high saturated pixels that had their saturation pushed to the lower saturation value. The remainder of the bitmap image displays shades of dark grey and black that correspond to saturation values between 0 and 1. These remaining regions in the bitmap correspond to the regions in the original image 1005 that were less colorful. These regions were also treated as low and mid saturated pixels. The values of the low saturated pixels were maintained, while the mid saturated pixels were pushed to lower saturation values.

D. Different Blending Operations at Different Slider Positions

After the saturation tool calculates the modified pixel values for each pixel in the original image, in some embodiments, the saturation tool next mixes the original image and the first modified image to produce the final non-photorealistic image. The slider tool uses the following Equation O to compute the weighting values of each image towards the final image:

SecondMod=(1-$SV$)OrigImg+$SV$(FirstMod)   (O)

In equation O, SecondMond is the final non-photorealistic image that will be displayed to a user after applying the de-saturation effect to an image, SV is the slider value which was described above, OrigImg is the original image without any processing of the de-saturation effect, and FirstMod is the first modified image produced after applying either the positive de-saturation effect or the negative de-saturation effect to the original image.

As shown by equation O, the weighting value computed for each the original image and the first modified image is based on the slider amount received from the user. When the slider is at the origin, the slider value is equal to zero. In this situation, the final image is set equal to the original image since the modified image is multiplied by 0 and thus given no weight towards the final non-photorealistic image. When the slider value is at the limit of 1 (i.e., when the slider is one of its two extremes), the final image is completely weighted towards the first modified image, and therefore the equation applies zero weight to the original image. This results in the final non-photo realistic image being the first modified image, which is a grey scale image with zero saturated pixels since the slider value of 1 completely de-saturates an image in both the positive and negative de-saturation effect. Between the slider range of 0 and 1, the final image is a weighted average of the original image and the first modified image.

When the slider moves closer to the 1 value, some embodiments adjust the weighting coefficients to ensure that more of the first modified image is weighted in the blending operation of the original and first modified images. Alternatively, while the slider is closer to the origin, some embodiments select the weighting coefficients to ensure that the original image more heavily influences the second modified image. At both ends of the sliding region, some embodiments completely weight the second image towards the first modified image and give no weight to the original image.

In some embodiments, the equation uses an exponential function for adjusting the weights given to each image. For example, the equation modifies the adjusted slider value by raising it to a power, such has 0.4. By raising the slider value to a power, the equation changes the rate by which each image is applied towards the equation, which by default is linear. For instance, by weighting the slider to a 0.4 power, a slider value of 0.5 would normally weigh each image equally towards the final image, with a value of 0.5 original and 0.5 for the first modified image. However, by computing the slider value as $0.5^{0.4}$, the second image receives an increased weight of about 0.758 and the original image receives a weight of 0.24, which essentially changes the rate by which each image is used towards the final image.

By blending the two images, the saturation tool is able to present a gradual onset of the de-saturation effect and avoids an abrupt and drastic appearance that would occur if only using the first modified image had been displayed to the user. Since the first modified image applies extreme modifications to certain pixels in the image, without blending the pixel with the original image, a user would experience much more drastic changes to the original image.

II. Saturation Slider Tool Modules and Processes

A. Modules

Figure 11:
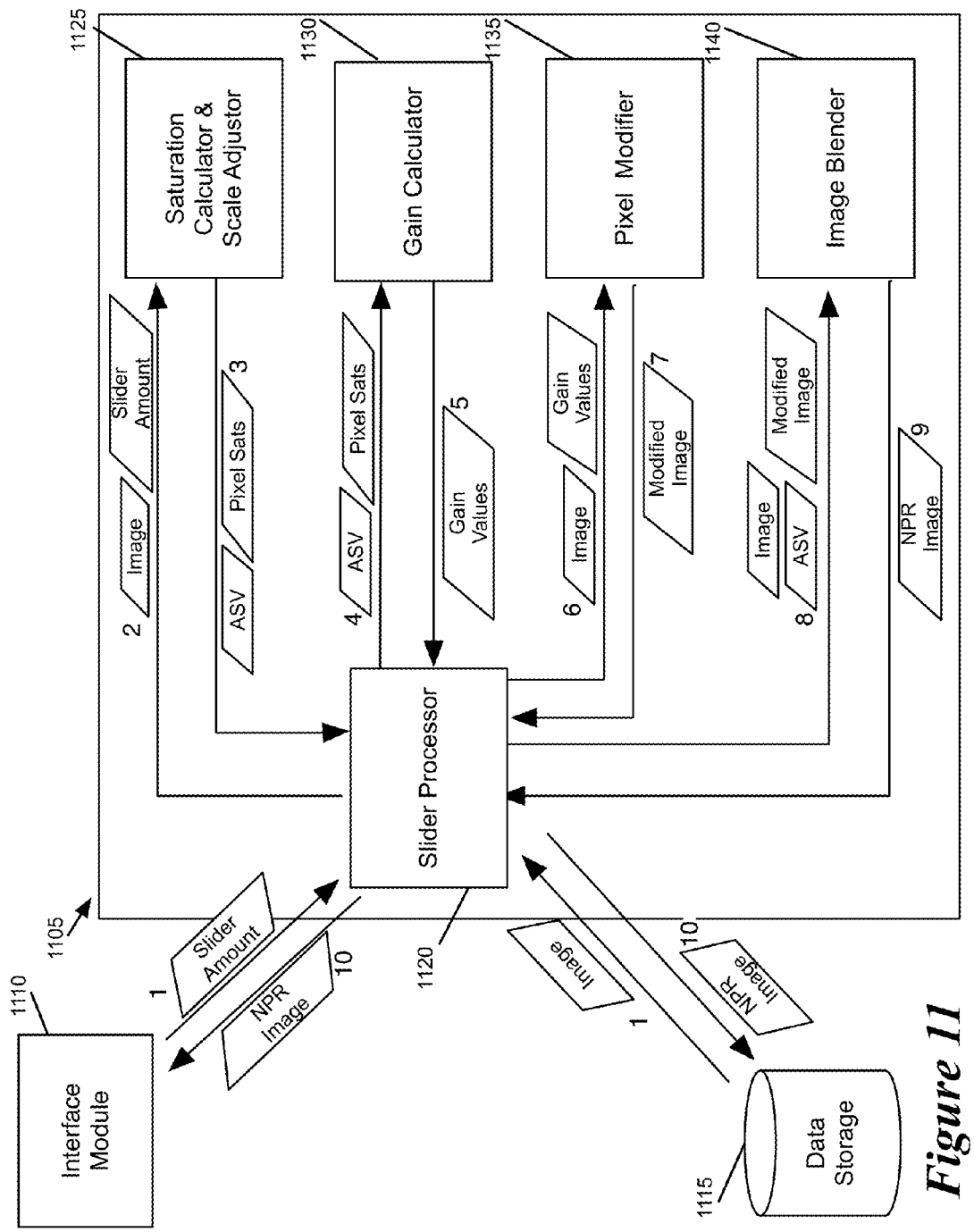
FIG. 11 conceptually illustrates the software architecture for the saturation slider tool of some embodiments.

FIG. 11 conceptually illustrates the software architecture for the saturation slider tool of some embodiments. The saturation slider tool 1105 is used to generate the positive de-saturation effect and the negative de-saturation effect for applying to an image in an image editing application. In some embodiments, the application is a stand-alone application or is integrated into another application (for instance, an image editing application). FIG. 11 illustrates that the saturation slider tool 1105 includes a slider processor 1120, a saturation calculator and scale adjustor 1125, a gain calculator 1130, a pixel modifier 1135, and an image blender 1140. This figure also illustrates an interface module 1110 and a data storage 1115 with which the slider tool 1105 interacts.

The slider processor 1120 is the central control module of the tool. Through it, the saturation slider retrieves images from and stores edited images to the data storage 1115. This processor also interacts with the interface module 1110 to receive input with respect to the tool (e.g., the opening and closing of the tool) and the sliders (e.g., the movement of the sliders) from a user or another module. A user interacts with the slider through the touch sensitive screen of the display in some embodiments. In these or other embodiments, the user interaction can be through another input device (e.g., a cursor controller, such as a mouse, a touchpad, a trackpad, or a keyboard, etc.). All user inputs that relate to the movement of the saturation slider are passed to the slider tool 1105 through the interface module 1110.

The slider tool 1105 can be invoked for an image in different ways in some embodiments. For instance, in some cases, the slider tool is invoked after a first image has been selected for display in the preview display area. In other cases, before the selection of the first image for display, the slider tool is invoked for a second image. In this case, the slider tool is invoked for the first image automatically as it was already selected for the second image.

Irrespective of how it is invoked, the slider tool 1105 first calls the saturation calculator 1125 when it is invoked for an image. As mentioned above, the slider tool in some embodiments receives the image data in terms of RGB values. In these embodiments, the calculator computes the saturation value for each pixel by subtracting the smallest component RGB value from the largest component RGB value. The saturation calculator also computes the initial scale of the saturation slider based on the computed threshold saturation value. The saturation calculator then computes an adjusted slider value from the current slider value and the computed scale of the saturation slider. In some embodiments, the saturation calculator performs these two operations based on the approaches that are described above in Section I.C.1. Each time the saturation slider moves, the slider processor 1120 will direct the saturation calculator to calculate an adjusted slider value.

The gain calculator 1130 receives, from the slider processor 1120, the adjusted slider value (ASV) and the saturation values of each pixel. Based on these received values, the gain calculator 1130 determines the particular gain value to apply to each pixel of the image. One manner of performing these gain computations is described above in Section I.C.1. As described above, the gain calculation involves an implicit or explicit pixel classification that is based on the pixel saturation values and the adjusted slider value.

The pixel modifier 1135 generates a first modified image from the original image and the gain values computed by the gain calculator. In some embodiments, the pixel modifier uses the Equations (K)-(N) which are described above in Section I.C.1 to generate the first modified image.

The image blender 1140 generates a second modified image from the original image, the first modified image, and the adjusted slider value. In some embodiments, the image blender uses the approach described above in Section I.D to generate the blended image.

The operation of the slider tool 1105 will now be described. When the slider tool is initially invoked for an image, the slider processor 1120 interacts with the saturation calculator 1125 to (1) compute the saturation value for each pixel of a received image, (2) specify the scale of the saturation slider based on the computed saturation values, and (3) compute an adjusted slider value based on the received slider position and the adjusted slider scale. Also, whenever the slider tool is notified of a new position for the slider, the tool directs the saturation calculator to compute a new adjusted slider value.

After obtaining the adjusted slider value for a new slider position, the slider processor 1120 supplies the gain calculator 1130 with the adjusted slider value and the computed saturation values of the image. In response, the gain calculator calculates the gain value for each pixel based on that pixel's saturation value and the adjusted slider value. Next, the slider processor 1120 uses the pixel modifier 1135 to generate a first modified image from the received image based on the computed gain values for the pixels. Lastly, the slider processor 1120 uses the image blender 1140 to blend the original image and the first modified image based on the adjusted slider value. The slider processor 1120 sends the final blended image to the interface module 1110 to be displayed to the user of the application. The slider processor 1120 also updates and stores the blended image in the data storage 1115.

B. Processes

Figure 12:
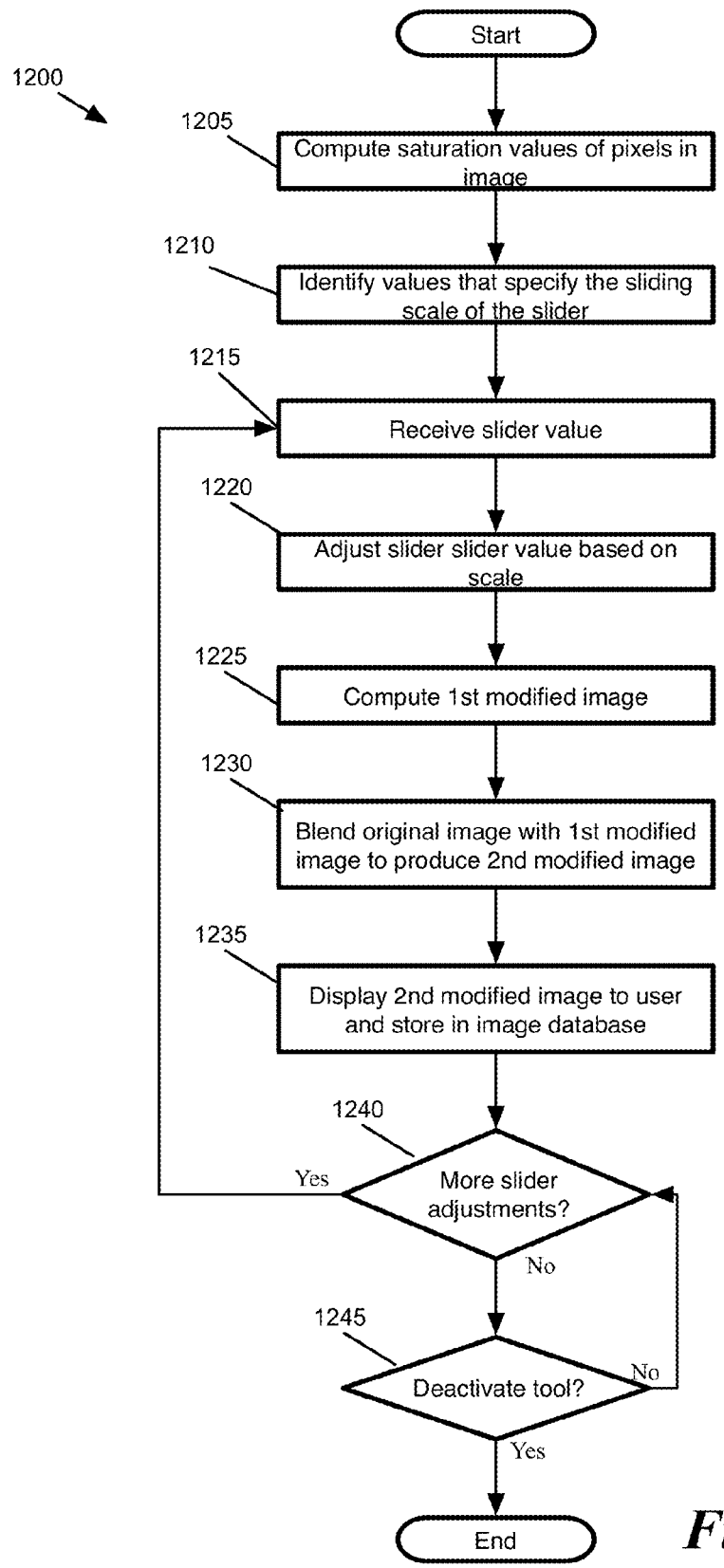
FIG. 12 conceptually presents a process for applying the color modification slider tool to pixels in an image in accordance with some embodiments.

FIG. 12 presents a process 1200 for applying the color modification slider tool to pixels in an image in accordance with some embodiments of the invention. The process initially computes (at 1205) the saturation values of the pixels in an image by computing the difference between the highest component RGB color value of the pixel and the lowest component RGB color value of the pixel, as described with reference to equation A above.

The process next identifies (at 1210) one more values that specify the sliding scale of the slider. In some embodiments, the operation identifies (at 1210) the saturation value below which a certain threshold percentile (e.g., 95%) saturation value for all pixels in the image reside. Once the process identifies one or more values that specify the sliding scale of the slider, the process receives (at 1215) an amount of slider value to apply to the image. The process next adjusts (at 1220) the amount of the slider value based on the identified sliding scale of the slider. As mentioned above by reference to Equation B, some embodiments produces the adjusted slider value by multiplying the slider value with the saturation threshold value.

The process next computes (at 1225) the first modified image using the adjusted slider value. In order to produce the first modified image, the process modifies each pixel in the image by applying a gain function to the pixel that implicitly classifies each pixel as a low saturated, mid saturated and high saturated pixel based on the pixel's computed saturation value and the adjusted slider value, as described in Equations C-J above. The operation at 1225 will be further described below by reference to FIG. 13.

After computing the first modified image, the process blends (at 1230) the original image with the first modified image to produce a second modified image. In some embodiments, the weighting coefficients that the process uses to blend the original and first modified images is dependent on the adjusted slider value for the current slider position. For instance, as the slider moves more to the right or to the left, some embodiments adjust the weighting coefficients to ensure that more of the first modified image is weighted in the blending operation of the original and first modified images. Alternatively, while the slider is close to the origin, some embodiments select the weighting coefficients to ensure that the original image more heavily influences the second modified image. At both ends of the sliding region, in some embodiments the process completely weight the second modified image towards the first modified image and give no weight to the original image.

The process next displays (at 1235) the second modified image to the user and stores the second modified image in the image database. Next, the process determines (at 1240) whether any additional slider values have been received. If no additional slider values have been received, the process determines (at 1245) whether the slider tool has been deactivated. The slider tool is deactivated when the tool is closed, another tool is selected, or the application is closed. If the process determines that the tool has been deactivated, the process ends. Otherwise, the process returns to 1240 to see whether any additional slider adjustments have been received. The process loops through 1240 and 1245 until the tool is deactivated or the slider value is adjusted again.

Figure 13:
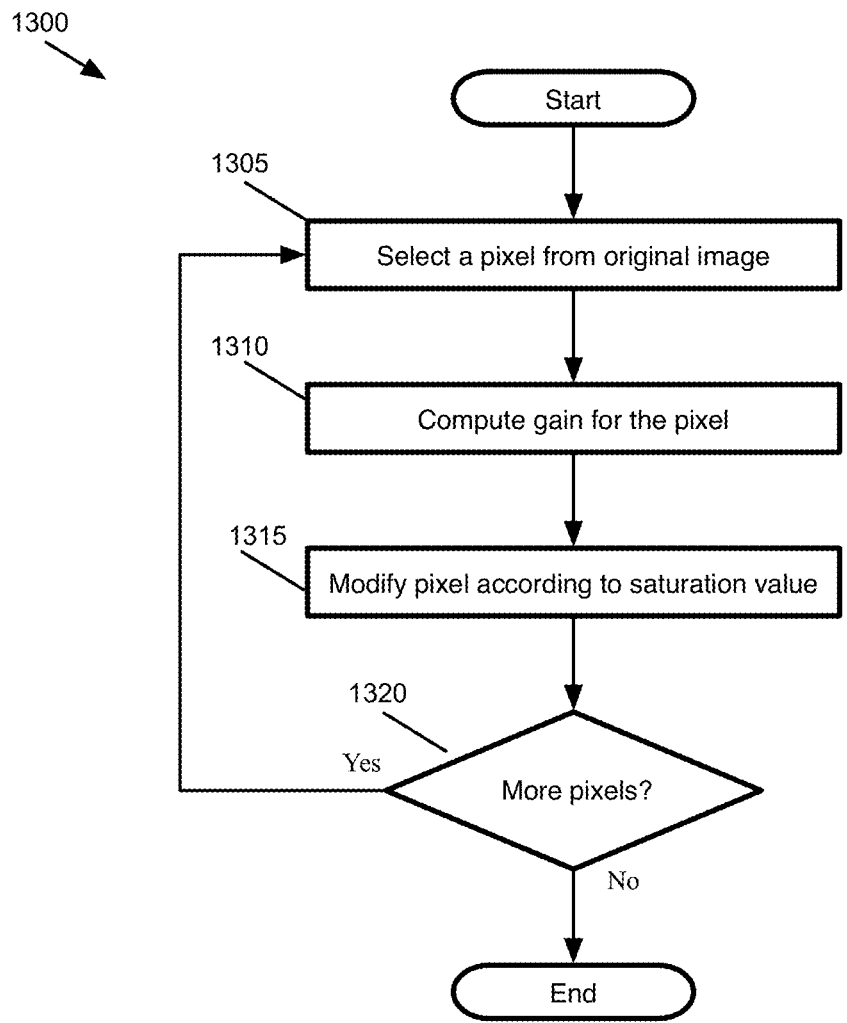
FIG. 13 conceptually presents a process for generating a first modified image based on the adjusted slider value and the computed pixel saturation values.

FIG. 13 presents a process 1300 for generating a first modified image based on the adjusted slider value and the computed pixel saturation values. The process begins by selecting (at 1305) a pixel in the original image. In some embodiments, the process next computes (at 1310) the gain for the pixel based on different negative and positive gain functions (C)-(J) that were described above. Each of these gain functions implicitly classifies each pixel in the image as a high saturated, mid saturated, or low saturated pixel. For the positive de-saturation effect, these gain values that are computed by these functions will push the values of high and low saturated pixels to the extremes and linearly increases the values of some mid saturated pixels (i.e., those with gains between 1 to 1.5) while decreasing the values of other mid saturated pixels (i.e., those with gains between 0 to 1). For the negative de-saturation effect, the gain values push the values of the high saturated pixels towards their mid channel value (to their "de-saturation" extreme), leave the values of the low saturated pixels unchanged, and linearly modify the values of the mid saturated pixels.

After 1310, the process modifies (at 1315) the pixel by adjusting the pixel's component color values based on the computed gain and adjusted slider value. In some embodiments, the process identifies the new component RGB clause for the pixel based on the above described Equation K-M above. The process next examines (at 1320) whether there are any more pixels in the image to modify, and if there are more pixels, the process returns to 1305 to select another pixel from the original image. Otherwise, the process ends.

III. Image Viewing, Editing, and Organization Application

Figure 14:
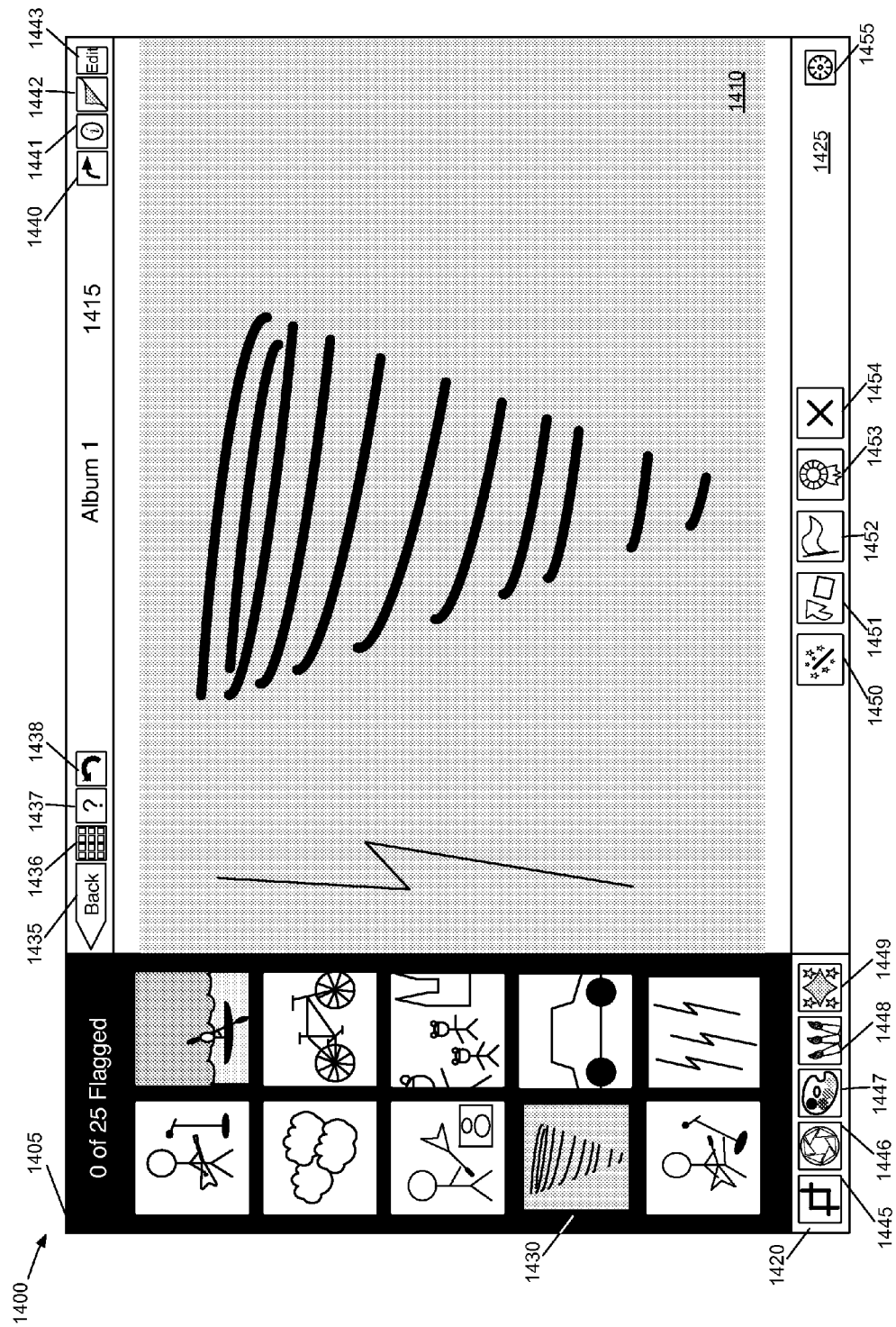
FIG. 14 conceptually illustrates a detailed view of a GUI of some embodiments for viewing, editing, and organizing images.
Figure 15:
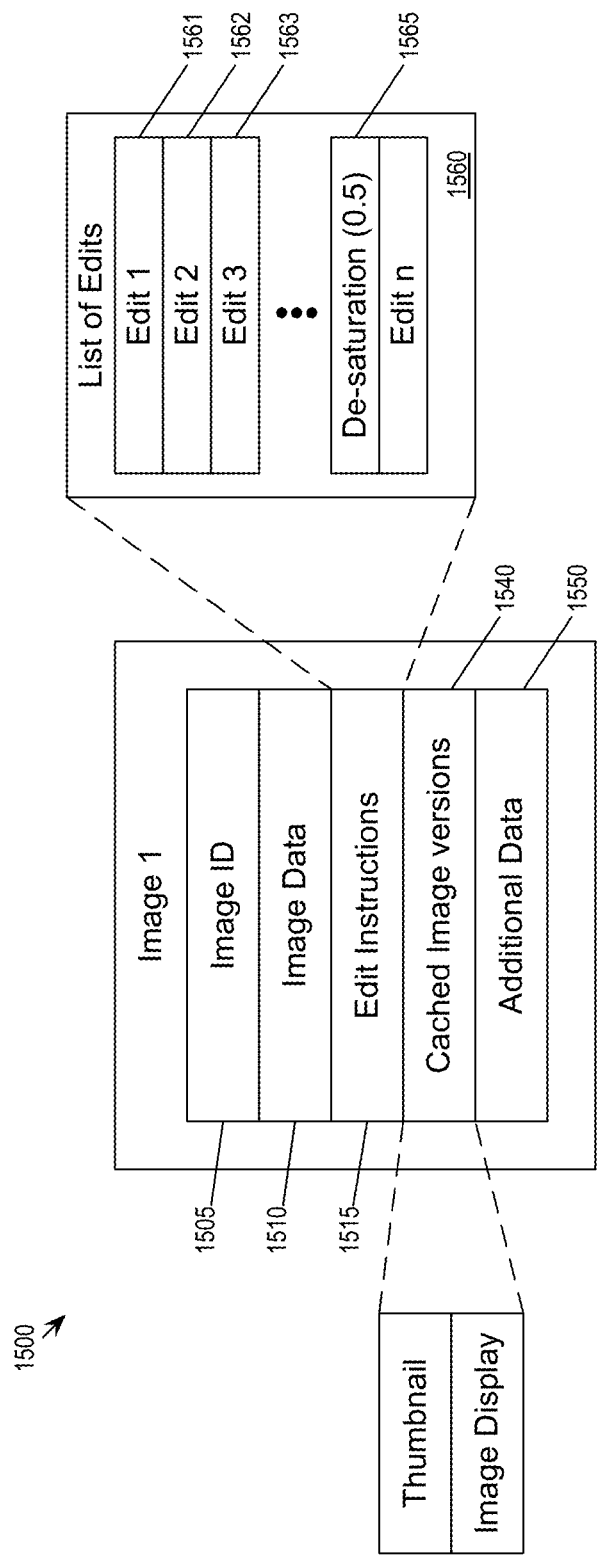
FIG. 15 conceptually illustrates a data structure for an image as stored by the application of some embodiments.

The above-described figures illustrated various examples of the GUI of an image viewing, editing, and organization application of some embodiments. FIG. 14 illustrates a detailed view of a GUI 1400 of some embodiments for viewing, editing, and organizing images. The GUI 1400 will be described in part by reference to FIG. 15, which conceptually illustrates a data structure 1500 for an image as stored by the application of some embodiments.

The data structure 1500 includes an image ID 1505, image data 1510, edit instructions 1515, cached versions 1540 of the image, and any additional data 1550 for the image. The image ID 1505 is a unique identifier for the image, which in some embodiments is used by the collection data structures to refer to the images stored in the collection.

The image data 1510 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 1515 include information regarding any edits the user has applied to the image. In this manner, the application stores the image in a non-destructive format, such that the application can easily revert from an edited version of the image to the original at any time. For instance, the user can apply a saturation effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 1515 are implemented as a list 1560 of edit operations. The list 1560 includes edit operations such as edits 1561, 1562, 1563, and 1565. Each edit operation in the list 1560 specifies the necessary parameters for carrying out the edit operation. For example, the edit operation 1565 in the list 1560 specifies an edit to the image that applies a positive 0.5 de-saturation effect to the image.

In some embodiments, the list 1560 records the sequence of edit operations undertaken by the user in order to create the final edited image. In some embodiments, the list 1560 stores the edit instructions in the order that the image editing application applies the edits to the image in order to generate an output image for display, as some embodiments define a particular order for the different possible edits provided by the application. For example, some embodiments define the positive de-saturation effect or the negative de-saturation effect as one of the edit operations that are to be applied later than other edit operations such as crop and rotation, full-image exposure, and color adjustment. The list 1560 of some of these embodiments would store the edit instruction for the positive de-saturation effect or the negative de-saturation effect in a position (i.e., edit 1565) that would be applied later than some of the other edit operations (e.g., edits 1561-1563).

The cached image versions 1540 store versions of the image that are commonly accessed and displayed, so that the application does not need to repeatedly generate these images from the full-size image data 1510. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image. In some embodiments, the saturation thumbnails in the slider 205 are generated off the cached thumbnail image. Finally, the image data structure 1500 includes additional data 1550 that the application might store with an image (e.g., locations and sizes of faces, etc.). In some embodiments, the additional data can include Exchangeable image file format (Exif) data, caption data, shared image data, tags on the image or any other types of data. Exif data includes various information stored by the camera that are captured the image such as camera settings, GPS data, timestamps, etc. Caption is a user-entered description of the image. Tags are information that the application enables the user to associate with an image such as marking the image as a favorite, flagged, hidden, etc.

One of ordinary skill in the art will recognize that the image data structure 1500 is only one possible data structure that the application might use to store the required information for an image. For example, different embodiments might store additional or less information, store the information in a different order, etc.

Returning to FIG. 14, the GUI 1400 includes a thumbnail display area 1405, an image display area 1410, a first toolbar 1415, a second toolbar 1420, and a third toolbar 1425. The thumbnail display area 1405 displays thumbnails of the images in a selected collection. Thumbnails are small representations of a full-size image, and represent only a portion of an image in some embodiments. For example, the thumbnails in thumbnail display area 1405 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600× 1200 image were all located on the left side of the image, the application would use the leftmost 1200 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 1540 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above or through other user input interactions). The selected thumbnails are displayed with a highlight or other indicator of selection. In thumbnail display area 1405, the thumbnail 1430 is selected. In addition, as shown, the thumbnail display area 1405 of some embodiments indicates a number of images in the collection that have been flagged (e.g., having a tag for the flag set to yes). In some embodiments, this text is selectable in order to display only the thumbnails of the flagged images.

The application displays selected images in the image display area 1410 at a larger resolution than the corresponding thumbnails. The images are not typically displayed at the full size of the image, as images often have a higher resolution than the display device. As such, the application of some embodiments stores a cached version 1540 of the image designed to fit into the image display area. Images in the image display area 1410 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 1415 displays title information (e.g., the name of the collection shown in the GUI, a caption that a user has added to the currently selected image, etc.). In addition, the toolbar 1415 includes a first set of GUI items 1435-1438 and a second set of GUI items 1440-1443.

The first set of GUI items includes a back button 1435, a grid button 1436, a help button 1437, and an undo button 1438. The back button 1435 enables the user to navigate back to a collection organization GUI, from which users can select between different collections of images (e.g., albums, events, journals, etc.). Selection of the grid button 1436 causes the application to move the thumbnail display area on or off of the GUI (e.g., via a slide animation). In some embodiments, users can also slide the thumbnail display area on or off of the GUI via a swipe gesture. The help button 1437 activates a context-sensitive help feature that identifies a current set of tools active for the user and provides help indicators for those tools that succinctly describe the tools to the user. In some embodiments, the help indicators are selectable to access additional information about the tools. Selection of the undo button 1438 causes the application to remove the most recent edit to the image, whether this edit is a crop, color adjustment, etc. In order to perform this undo, some embodiments remove the most recent instruction from the set of edit instructions 1515 stored with the image.

The second set of GUI items includes a sharing button 1440, an information button 1441, a show original button 1442, and an edit button 1443. The sharing button 1440 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 1441 activates a display area that displays additional information about one or more selected images. The information displayed in the activated display area may include some or all of the Exif data 1525 stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data 1535 and sends this information to the website. The comment stream and, in some cases, additional information, are received from the website and displayed to the user.

The show original button 1442 enables the user to toggle between the original version of an image and the current edited version of the image. When a user selects the button, the application displays the original version of the image without any of the editing instructions 1515 applied. In some embodiments, the appropriate size image is stored as one of the cached versions 1540 of the image, making it quickly accessible. When the user selects the button again 1442 again, the application displays the edited version of the image, with the editing instructions 1515 applied.

The edit button 1443 allows the user to enter or exit edit mode. When a user has selected one of the sets of editing tools in the toolbar 1420, the edit button 1443 returns the user to the viewing and organization mode, as shown in FIG. 14. When the user selects the edit button 1443 while in the viewing mode, the application returns to the last used set of editing tools in the order shown in toolbar 1420. That is, the items in the toolbar 1420 are arranged in a particular order, and the edit button 1443 activates the rightmost of those items for which edits have been made to the selected image.

The toolbar 1420, as mentioned, includes five items 1445-1449, arranged in a particular order from left to right. The crop item 1445 activates a cropping and rotation tool that allows the user to align crooked images and remove unwanted portions of an image. The exposure item 1446 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 1447 activates a set of color tools that enable the user to modify the saturation and vibrancy, as well as color-specific saturations (e.g., blue pixels or green pixels) and white balance. In some embodiments, some of these tools are presented as a set of sliders. The brushes item 1448 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 1449 activates a set of special effects that the user can apply to the image. These effects include duotone effect, grainy effect, gradients, tilt shifts, non-photorealistic desaturation effects, greyscale effects, various filters, etc. In some embodiments, the application presents these effects as a set of items that fan out from the toolbar 1425.

As stated, the UI items 1445-1449 are arranged in a particular order. This order follows the order in which users most commonly apply the five different types of edits. Accordingly, the editing instructions 1515 are stored in this same order, in some embodiments. When a user selects one of the items 1445-1449, some embodiments apply only the edits from the tools to the left of the selected tool to the displayed image (though other edits remain stored within the instruction set 1515).

The toolbar 1425 includes a set of GUI items 1450-1454 as well as a settings item 1455. The auto-enhance item 1450 automatically performs enhancement edits to an image (e.g., removing apparent red-eye, balancing color, etc.). The rotation button 1451 rotates any selected images. In some embodiments, each time the rotation button is pressed, the image rotates 90 degrees in a particular direction. The auto-enhancement, in some embodiments, comprises a predetermined set of edit instructions that are placed in the instruction set 1515. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 1452 tags any selected image as flagged. In some embodiments, the flagged images of a collection can be displayed without any of the unflagged images. The favorites button 1453 allows a user to mark any selected images as favorites. In some embodiments, this tags the image as a favorite and also adds the image to a collection of favorite images. The hide button 1454 enables a user to tag an image as hidden. In some embodiments, a hidden image will not be displayed in the thumbnail display area and/or will not be displayed when a user cycles through the images of a collection in the image display area. As discussed above by reference to FIG. 15, many of these features are stored as tags in the image data structure.

Finally, the settings button 1455 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 1400 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

X. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 16:
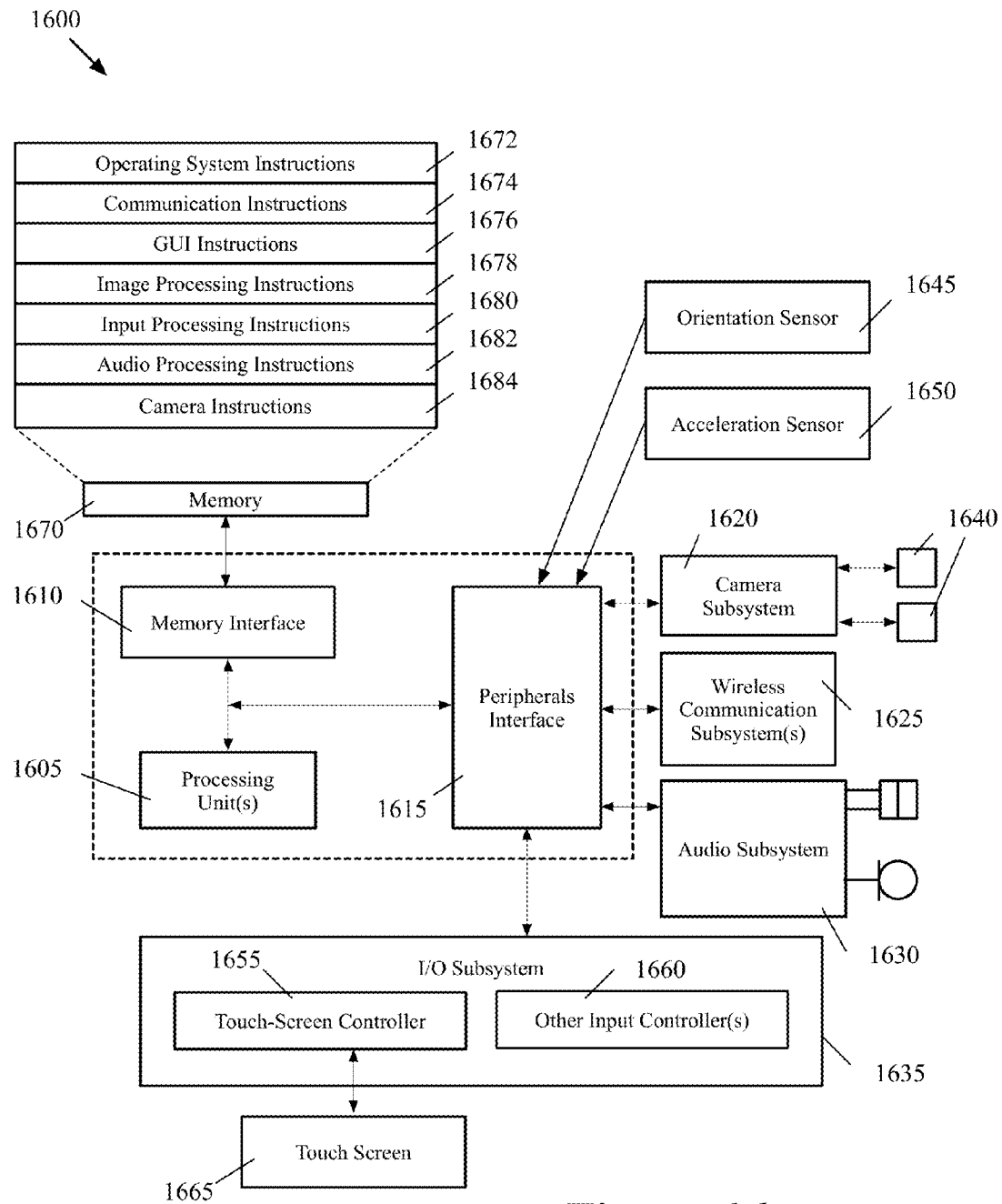
FIG. 16 is an example of architecture of a mobile computing device.

The image editing and viewing applications of some embodiments operate on mobile devices. FIG. 16 is an example of an architecture 1600 of such a mobile computing device. Examples of mobile computing devices include smartphones, tablets, laptops, etc. As shown, the mobile computing device 1600 includes one or more processing units 1605, a memory interface 1610 and a peripherals interface 1615.

The peripherals interface 1615 is coupled to various sensors and subsystems, including a camera subsystem 1620, a wireless communication subsystem(s) 1625, an audio subsystem 1630, an I/O subsystem 1635, etc. The peripherals interface 1615 enables communication between the processing units 1605 and various peripherals. For example, an orientation sensor 1645 (e.g., a gyroscope) and an acceleration sensor 1650 (e.g., an accelerometer) is coupled to the peripherals interface 1615 to facilitate orientation and acceleration functions.

The camera subsystem 1620 is coupled to one or more optical sensors 1640 (e.g., a charged coupled device (CCD) optical sensor, a complementary metal-oxide-semiconductor (CMOS) optical sensor, etc.). The camera subsystem 1620 coupled with the optical sensors 1640 facilitates camera functions, such as image and/or video data capturing. The wireless communication subsystem 1625 serves to facilitate communication functions. In some embodiments, the wireless communication subsystem 1625 includes radio frequency receivers and transmitters, and optical receivers and transmitters (not shown in FIG. 16). These receivers and transmitters of some embodiments are implemented to operate over one or more communication networks such as a GSM network, a Wi-Fi network, a Bluetooth network, etc. The audio subsystem 1630 is coupled to a speaker to output audio (e.g., to output different sound effects associated with different image operations). Additionally, the audio subsystem 1630 is coupled to a microphone to facilitate voice-enabled functions, such as voice recognition, digital recording, etc.

The I/O subsystem 1635 involves the transfer between input/output peripheral devices, such as a display, a touch screen, etc., and the data bus of the processing units 1605 through the peripherals interface 1615. The I/O subsystem 1635 includes a touch-screen controller 1655 and other input controllers 1660 to facilitate the transfer between input/output peripheral devices and the data bus of the processing units 1605. As shown, the touch-screen controller 1655 is coupled to a touch screen 1665. The touch-screen controller 1655 detects contact and movement on the touch screen 1665 using any of multiple touch sensitivity technologies. The other input controllers 1660 are coupled to other input/control devices, such as one or more buttons. Some embodiments include a near-touch sensitive screen and a corresponding controller that can detect near-touch interactions instead of or in addition to touch interactions.

The memory interface 1610 is coupled to memory 1670. In some embodiments, the memory 1670 includes volatile memory (e.g., high-speed random access memory), non-volatile memory (e.g., flash memory), a combination of volatile and non-volatile memory, and/or any other type of memory. As illustrated in FIG. 16, the memory 1670 stores an operating system (OS) 1672. The OS 1672 includes instructions for handling basic system services and for performing hardware dependent tasks.

The memory 1670 also includes communication instructions 1674 to facilitate communicating with one or more additional devices; graphical user interface instructions 1676 to facilitate graphic user interface processing; image processing instructions 1678 to facilitate image-related processing and functions; input processing instructions 1680 to facilitate input-related (e.g., touch input) processes and functions; audio processing instructions 1682 to facilitate audio-related processes and functions; and camera instructions 1684 to facilitate camera-related processes and functions. The instructions described above are merely exemplary and the memory 1670 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 16 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 16 may be split into two or more integrated circuits.

B. Computer System

Figure 17:
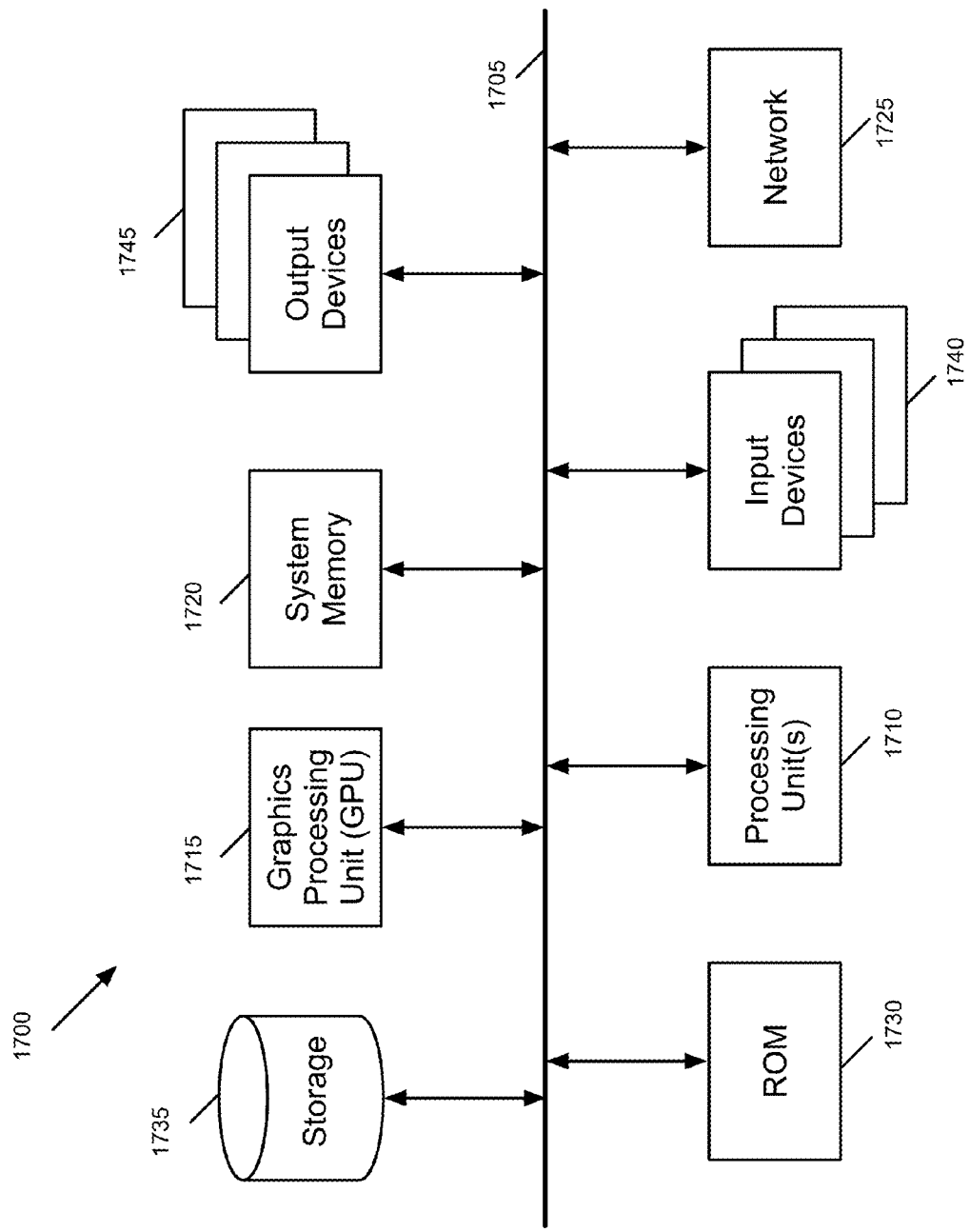
FIG. 17 conceptually illustrates an example of an electronic system with which some embodiments are implemented.

FIG. 17 conceptually illustrates another example of an electronic system 1700 with which some embodiments of the invention are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 4, 12 and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Figure 18:
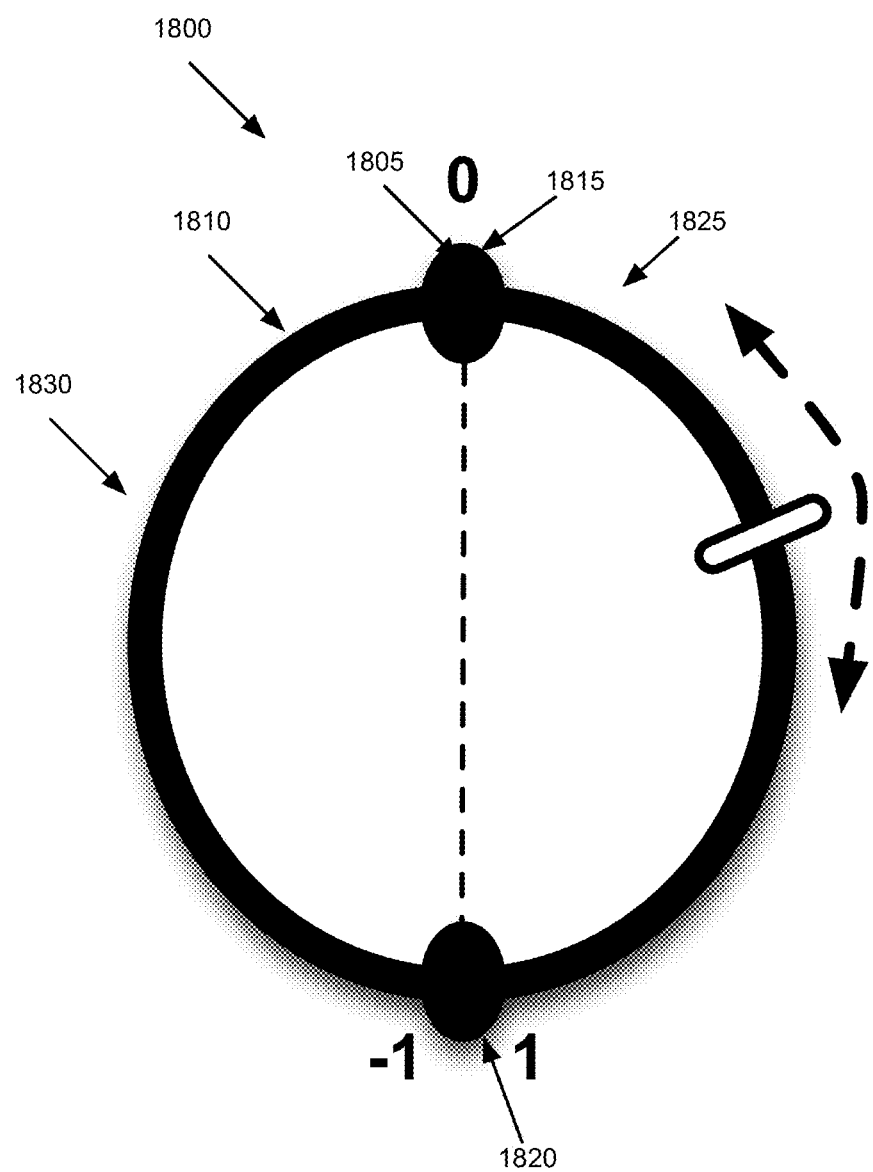
FIG. 18 is an example of a slider that moves along an arc.

Also, many of the examples illustrated in the figures described above show sliders that move along a straight line. However, as mentioned above, some embodiments use sliders that move along an arc. One example of such a slider 1805 is illustrated in FIG. 18. This figure illustrates a slider tool 1800, which includes a circular track 1810 and the slider 1805 that slides along this track in one of two direction. The first direction spans from the top 1815 of the circular track (i.e., at the 90 degree position) to the bottom 1820 of the circular track (i.e., at the −90 degree position) along the right half 1825 of the circular track. The second direction spans from the top 1815 of the circular track (i.e., at the 90 degree position) to the bottom 1820 of the circular track (i.e., at the −90 degree position) along the left half 1830 of the circular track.

In some embodiments, the right half of the circular track specifies the range of values for the positive de-saturation effect, while the left half of the circular track specifies the range of values for the negative de-saturation effect. In this slider tool, the top 1815 corresponds to the origin of the slider track, while the bottom 1820 corresponds to the two extreme positions of the slider along the positive and negative directions. For embodiments that have the positive and negative de-saturation effects produce identical or related results at the origin and the extremes, the tying of the origin and the extremes along the track 1810 conceptually illustrates the similar results produced by the two functions at these location of the slider.

Also, in several embodiments described above, the slider is a separate object from the sliding track, and slides along the sliding track. In other embodiments, the slider is part of the sliding track. For instance, in some embodiments that use a circular slider, the slider is a location on the circular slider track that rotates about the slider's rotation axis. In some of these embodiments, the slider location has to be affirmatively selected by the user, while in other embodiments, it simply is indicative of the current rotation angle of the rotating circular slider track. In these embodiments, the rotating circular slider track does not have another object slide along it. Accordingly, it could simply be viewed as a rotating object, such as a dialer. All embodiments described above (e.g., by reference to FIGS. 1, 2, 3, 5, 8, 9, 10, and 18) are implemented as rotating objects (e.g., as rotating dialers) in other embodiments.

In view of the foregoing, one of ordinary skill in the art would understand that the invention is not to be limited by the foregoing illustrative details, but rather is to be defined by the appended claims.

What is claimed is:

1. A non-transitory machine readable medium storing a program for execution by at least one processing unit of a computing device, the program comprising sets of instructions for:
displaying a movable user-interface tool for applying either a first effect or a second effect to an image, wherein said first effect adjusts an attribute of a first set of pixels in the image according to a first gain function and said attribute of a second set of pixels in the image according to a second gain function, and said second effect adjusts said attribute of the first set of pixels in the image according to a third gain function and said attribute of the second set of pixels in the image according to a fourth gain function;
in response to a command to move said movable user-interface tool in a first direction, applying said first effect to said image; and
in response to a command to move said movable user-interface tool in a second direction, applying said second effect to said image,
wherein the displaying and applying are performed by the computing device.

2. The non-transitory machine readable medium of claim 1, wherein the moveable user-interface tool is a slider.

3. The non-transitory machine readable medium of claim 1, wherein the moveable user interface tool is a dial.

4. The non-transitory machine readable medium of claim 1, wherein the set of instructions for applying said first effect comprises a set of instructions to decrease said attribute of each pixel of the first set of pixels in the image.

5. The non-transitory machine readable medium of claim 4, wherein the set of instructions for applying said first effect further comprises a set of instructions for increasing said attribute of each pixel of the second set of pixels in the image.

6. The non-transitory machine readable medium of claim 5, wherein the second set of pixels comprises pixels each of which have a higher initial attribute value than each pixel of the first set of pixels.

7. The non-transitory machine readable medium of claim 6, wherein the set of instructions for applying said second effect further comprises sets of instructions for:
decreasing said attribute of each of a third plurality of pixels in the image; and
maintaining said attribute of each of a fourth plurality of pixels in the image.

8. The non-transitory machine readable medium of claim 4, wherein said attribute comprises one of a saturation value for each pixel and a brightness value of each pixel.

9. A non-transitory machine readable medium storing a program for execution by at least one processing unit of a computing device, the program comprising sets of instructions for:
receiving an image having a plurality of pixels comprising a first set of pixels and a second set of pixels;
receiving a single movement of a user-selectable tool;
when the single movement is in a first direction, adjusting saturation values of the first set of pixels of the image according to a first gain function and saturation value of the second set of pixels of the image according to a second gain function;
when the single movement is in a second direction, adjusting the saturation values of the first set of pixels of the image according to a third gain function and the saturation values of the second set of pixels of the image according to a fourth gain function,
wherein the receiving of the image, the receiving of the single movement, and the adjusting of the saturation values are performed by the computing device.

10. The non-transitory machine readable medium of claim 9, wherein said adjusting comprises decreasing of the saturation values of the second set of pixels, wherein said program further comprises a set of instructions for decreasing saturation values of a third set of pixels by a smaller percentage than a percentage of decreasing of the saturation values of the second set of pixels.

11. The non-transitory machine readable medium of claim 10, wherein decreasing saturation values of said second set of pixels comprises reducing said saturation values to zero.

12. The non-transitory machine readable medium of claim 10, wherein said adjusting further comprises increasing the saturation values of the first set of pixels, wherein the program further comprises a set of instructions for increasing saturation values of a fourth set of pixels by a smaller percentage than a percentage increase of the saturation values of the first set of pixels.

13. A non-transitory machine readable medium storing a program for execution by at least one processing unit of a computing device, the program comprising sets of instructions for:
receiving an image having a plurality of pixels;
receiving, through a user selectable tool, an input;
maintaining non-zero saturation values of a first set of pixels of the image and decreasing saturation values of a second set of pixels when said received input corresponds to a first user gesture at the user-selectable tool; and
decreasing the saturation values of the first set of pixels and increasing the saturation values of the second set of pixels of the image when said received input corresponds to a second user gesture at the user-selectable tool,
wherein the maintaining, decreasing, and increasing of said saturation values are performed by the computing device.

14. The non-transitory machine readable medium of claim 13, wherein the program further comprises a set of instructions for determining a classification threshold for classifying pixels in the image as the first set of pixels or the second set of pixels.

15. The non-transitory machine readable medium of claim 14, wherein the program further comprises a set of instructions for classifying pixels having saturation values below the threshold as belonging to the first set of pixels and classifying pixels having saturation values above the threshold as belonging to the second set of pixels.

16. A method comprising:
- displaying a movable user-interface tool for applying either a first effect or a second effect to an image, wherein said first effect applies a first gain function to an attribute of a first set of pixels in the image and a second gain function to the attribute of a second set of pixels in the image, and said second effect applies a third gain function to the attribute of the first set of pixels in the image and a fourth gain function to the attribute of the second set of pixels in the image;
- in response to a command to move said movable user-interface tool in a first direction, applying said first effect to said image; and
- in response to a command to move said movable user-interface tool in a second direction, applying said second effect to said image
- wherein the displaying and applying are performed by a media editing application executing on a computing device.

17. The method of claim 16, wherein the moveable user-interface tool is a slider.

18. The method of claim 17, wherein the moveable user interface tool is a dial.

19. The method of claim 16, wherein applying said first effect comprises decreasing said attribute of each pixel of the first set of pixels in the image and increasing said attribute of each pixel of the second set of pixels in the image.

20. The method of claim 19, wherein the second plurality of pixels comprises pixels each of which have a higher initial attribute value than each pixel of said first plurality of pixels.

21. The method of claim 20, wherein applying said second effect further comprises:
- decreasing said attribute of each of a third plurality of pixels in the image; and
- maintaining said attribute of each of a fourth plurality of pixels in the image.

22. The method of claim 19, wherein said attribute comprises one of a saturation value for each pixel and a brightness value of each pixel.

23. A method comprising:
- receiving an image having a plurality of pixels comprising a first set of pixels and a second set of pixels;
- receiving, through a user-selectable tool, a single movement;
- when the single movement is in a first direction, adjusting saturation values of the first set of pixels of the image according to a first gain function and saturation values of the second set of pixels of the image according to a second gain function;
- when the single movement is in a second direction, adjusting the saturation values of the first set of pixels of the image according to a third gain function and the saturation values of the second set of pixels of the image according to a fourth gain function,
- wherein the receiving of the image, the receiving of the single movement, and the adjusting of the saturation values are performed by an image editing application executing on a computing device.

24. The method of claim 23, wherein adjusting the saturation values of the second set of pixels according to the fourth gain function comprises decreasing the saturation values of the second set of pixels, the method further comprising, when the single movement is in the second direction, decreasing saturation values of a third set of pixels by a smaller percentage than a percentage of decreasing of the saturation values of the second set of pixels.

25. The method of claim 24, wherein decreasing saturation values of said second set of pixels comprises reducing said saturation values to zero.

26. The method of claim 24, wherein said adjusting further comprises increasing the saturation values of the first set of pixels, the method further comprising increasing saturation values of a fourth set of pixels by a smaller percentage than a percentage increase of the saturation values of the first set of pixels.

27. A method comprising:
- receiving an image having a plurality of pixels;
- receiving, through a user selectable tool, an input;
- maintaining non-zero saturation values of a first set of pixels of the image and decreasing saturation values of a second set of pixels when said received input corresponds to a first user gesture at the user-selectable tool; and
- decreasing the saturation values of the first set of pixels and increasing the saturation values of the second set of pixels when said received input corresponds to a second, different user gesture at the user-selectable tool,
- wherein the maintaining, decreasing, and increasing of said saturation values are performed by an image editing application executing on a computing device.

28. The method of claim 27 further comprising determining a classification threshold for classifying pixels in the image as the first set of pixels or the second set of pixels.

29. The method of claim 28 further comprising classifying pixels having saturation values below the threshold as belonging to the first set of pixels and classifying pixels having saturation values above the threshold as belonging to the second set of pixels.

30. An apparatus comprising:
- a set of processing units for executing sets of instructions;
- a memory for storing a program which when executed by at least one of the processing units applies effects on images, the program comprising sets of instructions for:
  - displaying a movable user-interface tool for applying either a first effect or a second effect to an image, wherein said first effect adjusts an attribute of a first set of pixels in the image according to a first gain function and said attribute of a second set of pixels in the image according to a second gain function, and said second effect adjusts said attribute of the first set of pixels in the image according to a third gain function and said attribute of the second set of pixels in the image according to a fourth gain function;
  - in response to a command to move said movable user-interface tool in a first direction, applying said first effect to said image; and
  - in response to a command to move said user-interface tool in a second direction, applying said second effect to said image.

31. The apparatus of claim 30, wherein the set of instructions for applying said first effect comprises a set of instructions to decrease said attribute of each of a first plurality of pixels in the image and increasing said attribute of each of a second plurality of pixels in the image.

32. The apparatus of claim 31, wherein the second plurality of pixels comprises pixels each of which have a higher initial attribute value than each pixel of said first plurality of pixels.

33. The apparatus of claim 32, wherein the set of instructions for applying said second effect further comprises sets of instructions for:
- decreasing said attribute of each of a third plurality of pixels in the image; and maintaining said attribute of each of a fourth plurality of pixels in the image.

34. The apparatus of claim 31, wherein said attribute comprises one of a saturation value for each pixel and a brightness value of each pixel.

35. An apparatus comprising:
- a set of processing units for executing sets of instructions;
- a memory for storing a program for execution by at least one of the processing units, the program comprising sets of instructions for:
  - receiving an image having a plurality of pixels comprising first and second sets of pixels;
  - receiving, through a user-selectable tool, a single movement;
  - when the single movement is in a first direction, adjusting saturation values of the first set of pixels of the image according to a first gain function and saturation values of the second set of pixels of the image according to a second gain function;
  - when the single movement is in a second direction adjusting the saturation values of the first set of pixels of the image according to a third gain function and the saturation values of the second set of pixels of the image according to a fourth gain function.

36. The apparatus of claim 35, wherein adjusting the saturation values of the second set of pixels according to the second gain function comprises decreasing the saturation values of the second set of pixels, wherein the program further comprises a set of instructions for, when the single movement is in the first direction, decreasing saturation values of a third set of pixels by a smaller percentage than a percentage of decreasing of the saturation values of the second set of pixels.

37. The apparatus of claim 36, wherein decreasing saturation values of said second set of pixels comprises reducing said saturation values to zero.

38. The apparatus of claim 36, wherein said adjusting further comprises increasing the saturation values of the first set of pixels, wherein the program further comprises a set of instructions for increasing saturation values of a fourth set of pixels by a smaller percentage than a percentage increase of the saturation values of the first set of pixels.

* * * * *